United States Patent
Kang

(10) Patent No.: US 10,367,836 B2
(45) Date of Patent: Jul. 30, 2019

(54) METHOD AND APPARATUS FOR DETECTING ABNORMAL STATE OF BEACON DEVICE IN WIRELESS MESH NETWORK AND RECORDING MEDIUM STORING COMPUTER PROGRAM FOR EXECUTING THE METHOD

(71) Applicant: SK Planet Co., Ltd., Seongnam-si, Gyeonggi-do (KR)

(72) Inventor: Kichon Kang, Seoul (KR)

(73) Assignee: SK PLANET CO., LTD., Seongnam-si (KR)

(*) Notice: Subject to any disclaimer, the term of this patent is extended or adjusted under 35 U.S.C. 154(b) by 127 days.

(21) Appl. No.: 15/226,918

(22) Filed: Aug. 3, 2016

(65) Prior Publication Data

US 2017/0118235 A1    Apr. 27, 2017

(30) Foreign Application Priority Data

Oct. 27, 2015 (KR) .................. 10-2015-0149222
Oct. 30, 2015 (KR) .................. 10-2015-0151898
Oct. 30, 2015 (KR) .................. 10-2015-0151899

(51) Int. Cl.

| | |
|---|---|
| G08B 23/00 | (2006.01) |
| G06F 12/16 | (2006.01) |
| G06F 12/14 | (2006.01) |
| G06F 11/00 | (2006.01) |
| H04L 29/06 | (2006.01) |
| H04L 12/26 | (2006.01) |
| H04W 84/18 | (2009.01) |

(52) U.S. Cl.
CPC .......... *H04L 63/1425* (2013.01); *H04L 43/04* (2013.01); *H04W 84/18* (2013.01)

(58) Field of Classification Search
CPC ..... H04L 63/1425; H04L 43/04; H04W 84/18
USPC .......................................... 726/23
See application file for complete search history.

(56) References Cited

U.S. PATENT DOCUMENTS

| | | | |
|---|---|---|---|
| 2004/0029612 A1* | 2/2004 | Gorsuch ............... | H04W 48/18 455/552.1 |
| 2004/0072582 A1* | 4/2004 | Aljadeff .................. | G01S 5/06 455/456.1 |
| 2004/0203474 A1* | 10/2004 | Miller .................. | H04L 1/0001 455/69 |
| 2007/0258382 A1* | 11/2007 | Foll ........................ | H04L 41/12 370/252 |

(Continued)

OTHER PUBLICATIONS

Andreas Savvides; Dynamic FineGrained Localization in AdHoc Networks of Sensors; ACM:2001; p. 166-179.*

*Primary Examiner* — Monjur Rahim
(74) *Attorney, Agent, or Firm* — Brinks Gilson & Lione

(57) ABSTRACT

The present invention relates to a method and apparatus for detecting an abnormal state of a beacon device in a wireless mesh network and a recording medium storing a computer program for executing the method. The present invention may monitor service traffic for each beacon device, detect a beacon that does not operate normally according to a change in the amount of service traffic, and prevent interference using a state check message, and thus efficiently manage a wireless mesh network. The present invention may also upgrade firmware of the beacon device in the wireless mesh network without stopping networking.

10 Claims, 13 Drawing Sheets

(56) References Cited

U.S. PATENT DOCUMENTS

| | | | |
|---|---|---|---|
| 2007/0264962 A1* | 11/2007 | Ueno | H04B 1/707 455/343.2 |
| 2008/0305817 A1* | 12/2008 | Namekata | H04W 16/14 455/507 |
| 2009/0036062 A1* | 2/2009 | Tanaka | H04L 1/0003 455/69 |
| 2014/0211618 A1* | 7/2014 | Karaki | H04W 36/22 370/230 |
| 2016/0042366 A1* | 2/2016 | Lux | G06Q 30/0201 705/7.29 |
| 2016/0113055 A1* | 4/2016 | Fan | H04W 76/18 370/329 |
| 2016/0226627 A1* | 8/2016 | Nabetani | H04W 4/70 |
| 2017/0094445 A1* | 3/2017 | Shanmugam | H04W 4/80 |

* cited by examiner

METHOD AND APPARATUS FOR DETECTING ABNORMAL STATE OF BEACON DEVICE IN WIRELESS MESH NETWORK AND RECORDING MEDIUM STORING COMPUTER PROGRAM FOR EXECUTING THE METHOD

CROSS REFERENCE TO RELATED APPLICATION

This application claims the priority of Korean Patent Application No. 10-2015-0149222 filed on Oct. 27, 2015, Korean Patent Application No. 10-2015-0151898 filed on Oct. 30, 2015, and Korean Patent Application No. 10-2015-0151899 filed on Oct. 30, 2015 in the Korean Patent and Trademark Office. This application, in its entirety, is incorporated herein by reference.

TECHNICAL FIELD

The present invention relates to a method and apparatus for detecting an abnormal state of a beacon device in a wireless mesh network, a recording medium storing a computer program for executing the method, and more particularly, to a method and apparatus for monitoring service traffic between a service device and a user terminal that recognizes a beacon device, detecting a beacon that does not operate normally according to a variation of the service traffic, checking whether the service traffic is valid using a state check message to prevent interference by the validation of the service traffic, and a recording medium storing a computer program for executing the method.

Furthermore, according to the present invention, a parent beacon device that has received an upgrade schedule notification may inform a child beacon device that the parent beacon device is supposed to be updated and thus may request the child beacon device to connect to another parent beacon device, thus making it possible to provide seamless networking while the beacon device is being upgraded.

BACKGROUND

This section is intended to merely provide background for embodiments of the present invention and does not constitute prior art.

Generally, wireless networks have star-type topology structures such as point-to-point or point-to-multipoint configuration. However, recently, interest in wireless networks having a mesh-type structure such as multipoint-to-multipoint is increasing.

A wireless mesh network can be easily expanded without a connection to a wired network. Thus, the wireless mesh network has flexibility and expandability by providing speed and economic feasibility in installing the network, redundancy due to multi-path, or the like.

In a conventional wired network environment, signals are transferred through repeaters or wireless routers (also referred to as access points (APs)) that are all connected by wire.

However, in the mesh network, when a representative AP is connected by wire, the wireless communication routers which will serve as antennas like those of conventional wireless communication base stations become mesh nodes to connect all sections in a wireless manner. This technology which may allow a mesh network structure of a wired network to be also implemented in a wireless network has been introduced in order to overcome limitations of a conventional wireless local area network (WLAN).

While a hot-spot zone is an area in which anyone in a building can connect to WiFi to use a wireless communications network, a mesh network technology may establish a wireless network over a large area such as a resort, a public park, or a harbor.

Of course, the mesh network technology can allow the wireless network to be established over a much larger area depending on the application of the technology.

When the mesh network is established, users may use the network by performing steps similar to those for connecting to WiFi.

With the development of mobile communications networks and the advances in terminal specifications, mobile communication terminals have become a necessity for modern people and are evolving into total entertainment devices beyond typical simple communications devices or information providing devices.

Further, technologies for performing short-range wireless communication between devices that are located within a short distance are being rapidly developed, one of which is Bluetooth technology.

The Bluetooth communication has evolved into Bluetooth low energy (BLE) technology (Bluetooth 4.0) which is widely used in smart phones, retail geofencing, mobile payment, or the like. The BLE technology has lower power consumption than the standard Bluetooth wireless connection.

Further, service solutions for providing various pieces of information to mobile communication terminals of users are being developed utilizing a beacon that uses Bluetooth communication. Also, the number of cases in which the mesh network is established utilizing a beacon device that uses the Bluetooth communication is increasing.

For a wireless mesh network, when beacon devices constituting the mesh network are connected to each other based on WiFi, interference may occur due to channels used by other WiFi AP devices located in the vicinity of the beacon devices. When a smart beacon which is a WiFi beacon malfunctions or does not operate due to hacking or failure, it is also difficult for dummy beacons connected to the smart beacon to operate normally.

Thus, a technique for accurately and rapidly detecting a beacon device that is operating abnormally because of hacking or a failure and suppressing interference between the beacon device and the wireless WiFi AP device needs to be developed.

In addition, in a wireless mesh network structure composed of beacons, in order to upgrade firmware of a beacon device, networking associated with the corresponding beacon device is stopped. While the upgrade is in progress, child beacon devices having the beacon device being upgraded as the parent beacon device cannot use the mesh network.

SUMMARY

The present invention is directed to a method and apparatus for detecting an abnormal state of a beacon device in a wireless mesh network and a recording medium storing a computer program for executing the method, where the method and the apparatus can accurately and rapidly detect a beacon that does not operate normally due to hacking or a failure by monitoring service traffic associated with the beacon device.

The present invention is also directed to a method and apparatus for detecting an abnormal state of a beacon device in a wireless mesh network and a recording medium storing a computer program for executing the method, where the method and the apparatus can periodically receive a state check message from the beacon device and detect a failure or interference occurrence in the beacon device, in addition to the monitoring of the service traffic associated with the beacon device.

The present invention is also directed to a method and apparatus for upgrading firmware of the beacon device in the wireless mesh network without stopping networking.

The technical objectives of the present invention are not limited to the aforesaid, but other technical objects not described herein will be clearly understood by those skilled in the art from descriptions below.

TECHNICAL SOLUTION

One aspect of the present invention provides a service device including: a service communication unit configured to transmit and receive data to and from one or more of a user terminal device and beacon devices through a communications network; a service control unit configured to monitor service traffic generated between each of the beacon devices and the user terminal device that has recognized the beacon device to determine a state of the beacon device according to a variation of the amount of service traffic; and a service storage unit configured to store information regarding the service traffic of each of the beacon devices.

The service control unit may store statistical data about the service traffic generated for each beacon device in a normal state and compare the amount of service traffic being currently monitored corresponding to the beacon device with the statistical data about the service traffic in the normal state to determine the state of the beacon device.

The service control unit may determine that the beacon device does not operate normally, that is, is in an abnormal state when a difference between the monitored service traffic and the statistical data about the service traffic in the normal state is equal to or greater than a first reference value or when the monitored service traffic is equal to or less than a second reference value.

The service control unit may check a state check message periodically transmitted from the beacon device through the service communication unit and may examine whether the service traffic of the beacon device is valid and determine the state of the beacon device based on whether the service traffic is valid when the state check message is not received for a predetermined period or more.

The service control unit may compare the amount of service traffic being currently generated corresponding to the beacon device with a predetermined reference amount of service traffic, may determine that the beacon device has a failure when the currently generated amount of service traffic has decreased by a reference value or more from the predetermined reference amount of service traffic, and may determine that there is interference in the beacon device when the currently generated amount of service traffic has not decreased by a reference value or more from the predetermined reference amount of service traffic.

The service control unit may measure an average amount of service traffic generated corresponding to the beacon device in the normal state and may set the average amount of service traffic as the reference amount of service traffic.

The service control unit may perform control such that the beacon device changes a channel when a result of the determination of the state of the beacon device is that interference has occurred.

When a result of the determination of the state of the beacon device is that interference has occurred, the service control unit may check whether the beacon device is connectable to a wireless AP device and check whether the beacon device is connected to another beacon device or the wireless AP device. When the beacon device is connected to the other beacon device, the service control unit may perform control such that the beacon device releases the connection to the other beacon device to connect to the wireless AP device or still another beacon device rather than the other beacon device.

Another aspect of the present invention provides a method of detecting an abnormal state of a beacon device in a wireless mesh network, the method including: monitoring service traffic generated between each beacon device and a user terminal device that has recognized the beacon device by a service device; and determining a state of the beacon device according to a variation of the amount of service traffic by the service device.

The method may further include collecting statistical data about the service traffic generated for each beacon device in the normal state by the service device. The determining of a state of the beacon device may include comparing service traffic being currently monitored corresponding to the beacon device with the statistical data about the service traffic in the normal state to determine the state of the beacon device.

The determining of a state of the beacon device may include determining that the beacon device does not operate normally, that is, is in an abnormal state when a difference between the monitored service traffic and the statistical data about the service traffic in the normal state is equal to or greater than a first reference value or when the monitored service traffic is equal to or less than a second reference value.

The determining of a state of the beacon device may include checking a state check message periodically transmitted from the beacon device by the service device and examining whether the service traffic of the beacon device is valid to determine the state of the beacon device based on whether the service traffic is valid when the state check message is not received for a predetermined period or more.

The determining of a state of the beacon device may include comparing the amount of service traffic being currently generated corresponding to the beacon device with a predetermined reference amount of service traffic, determining that the beacon device has a failure when the currently generated amount of service traffic has decreased by a reference value or more from the predetermined reference amount of service traffic, and determining that interference has occurred in the beacon device when the currently generated service traffic has not decreased by a reference value or more from the predetermined reference amount of service traffic.

The method may further include measuring an average amount of service traffic generated corresponding to the beacon device in the normal state and setting the average amount of service traffic as the reference amount of service traffic.

The method may further include, when a result of the determination of the state of the beacon device is that interference has occurred, checking whether the beacon device is connectable to a wireless AP device and checking whether the beacon device is connected to another beacon device or the wireless AP device, and when the beacon device is connected to the other beacon device, performing control such that the beacon device releases the connection to the other beacon device and connects to the wireless AP device or still another beacon device rather than the other beacon device.

Another aspect of the present invention provides a non-transitory computer-readable recording medium having a program recorded thereon for executing the method of detecting an abnormal state of the beacon device.

DETAILED DESCRIPTION

Figure 1:
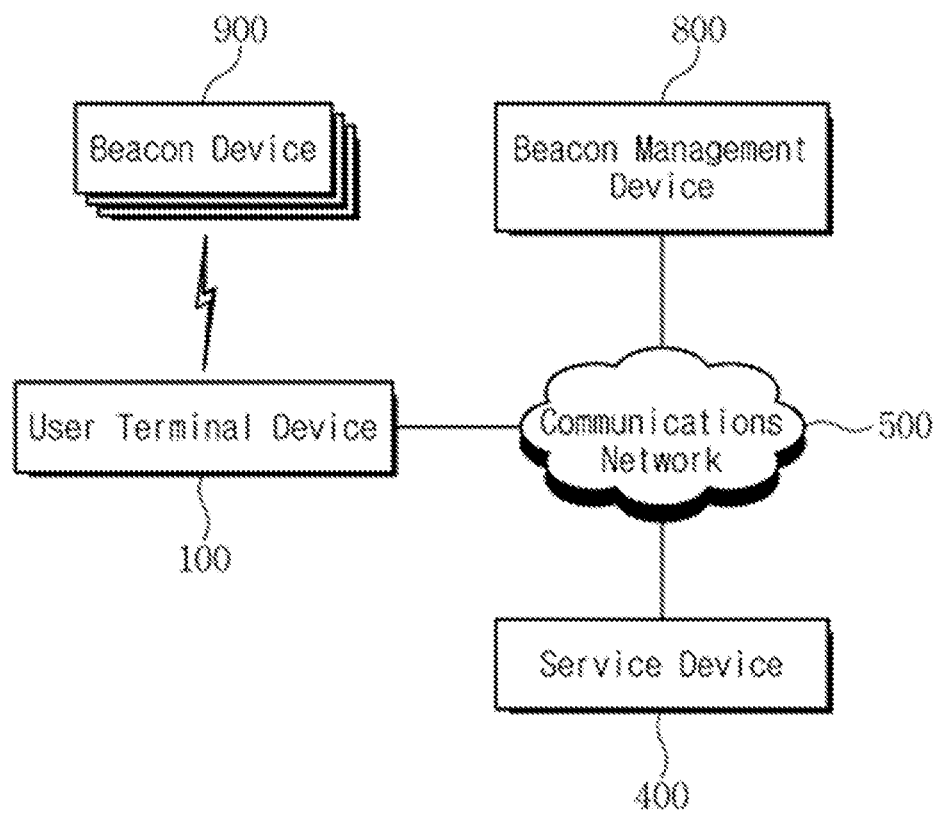
FIG. 1 is a block diagram schematically showing a wireless mesh network system according to an embodiment of the present invention.

Hereinafter, exemplary embodiments of the present invention will be described in detail with reference to the accompanying drawings. The features and advantages of aspects of the present invention will become more apparent from the detailed description set forth below.

However, detailed descriptions related to well-known functions or configurations will be ruled out in order not to unnecessarily obscure the subject matter of the present invention. In addition, it should be noted that like reference numerals denote like elements throughout the specification and drawings.

The terms or words used in the following description and drawings should not be construed as being limited to typical or dictionary meanings but should be construed as the meaning and concept corresponding to the technical idea of the present invention based on the principle that an inventor can appropriately define the concept of the term for describing his or her invention in the best manner. Accordingly, the configurations illustrated in embodiments and drawings described in the specification do not represent the technical idea of the present invention but are just exemplary embodiments. Thus, it should be understood that there may be various equivalents and modifications that can be replaced at the time of filing.

While the terms including an ordinal number, such as "first," "second," etc. may be used herein to describe various elements, such elements are not limited to those terms. The terms are only to distinguish one element from another. For example, a first element may be named a second element, and vice versa, without departing from the scope of the present invention.

It is to be understood that when one element is referred to as being "connected to" or "coupled to" another element, it may be connected or coupled logically or physically. In other words, it is to be understood that one element may be directly connected or coupled to another element or indirectly connected or coupled to another element with a third element intervening therebetween.

The terms used in the present specification are set forth to explain the embodiments of the present invention, and the scope of the present invention is not limited thereto. The singular forms 'a,' 'an,' and 'the' include plural reference unless the context clearly dictates otherwise.

In the present specification, it is to be understood that the terms such as "including," "having," and "comprising" are intended to indicate the existence of the features, numbers, steps, operations, components, parts, or combinations thereof disclosed in the specification and are not intended to preclude the possibility that one or more other features, numbers, steps, operations, components, parts, or combinations thereof may exist or may be added.

Moreover, th terms such as "unit," "part," and "module" described in the specification denotes an element for performing at least one function or operation, and may be implemented in hardware, software or a combination of hardware and software.

The use of the terms "a" and "an" and "the" and similar referents in the context of describing embodiments (especially in the context of the following claims) are to be construed to cover both the singular and the plural, unless otherwise stated or the context clearly indicates otherwise In addition to the above-described terms, specific terms used herein are provided to help understanding of the present invention, and the user of those specific terms may be replaced with other terms without departing from the technical concept of the present invention.

Further, embodiments within the scope of the present invention also include computer-readable media for carrying or storing computer-executable instructions and/or data structures. Such computer-readable media can be any available media that can be accessed by a general purpose or special purpose computer system.

Thus, by way of example, and not limitation, the computer-readable media can include physical computer-readable storage media including RAM, ROM, EEPROM, CD-ROM or other optical disk storage, magnetic disk storage or other magnetic storage devices, or any other medium which can be used to store or deliver a desired program code means in the form of computer-executable instructions, computer-readable instructions, or data structures and which can be accessed by a general purpose or special purpose computer.

Furthermore, those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like.

The present invention may also be practiced in distributed system environments where local and remote computer systems which are linked (either by hardwired data links, wireless data links, or by a combination of hardwired and wireless data links) through a network all perform tasks. In a distributed system environment, program modules may be located in both local and remote memory storage devices.

In addition, a method of detecting an abnormal state of a beacon device in a wireless mesh network using beacon technology according to the present invention will be described based on Bluetooth Low Energy (BLE) type data communication technology.

While NFC technology may be available only within several tens of centimeters, Bluetooth technology may operate in the range of several tens of meters and thus have been applied to a wide variety of applications. In particular, the Bluetooth technology can transfer data even when a user just passes through a place where a beacon device is installed without needing to approach and then touch a reader like in NFC technology, and also can read even location movement inside a building and transfer customized data.

However, a method of detecting an abnormal state of a beacon device according to the present invention is not necessarily limited to Bluetooth low energy (BLE) or Bluetooth. Accordingly, various personal area network (PAN)-type short-range communication technologies such as Zigbee, Ultra WideBand (UWB), ANT, Wi-Fi, and NFC may be available.

A method and apparatus for detecting an abnormal state of a beacon device in a wireless mesh network and a recording medium storing a computer program for executing the method according to an embodiment of the present invention will be described in detail with reference to the drawings.

FIG. 1 is a block diagram schematically showing a wireless mesh network system according to an embodiment of the present invention.

As shown in FIG. 1, a wireless mesh network system according to an embodiment of the present invention may include a user terminal device 100, a beacon device 900, a service device 400, a beacon management device 800, and a communications network 500 for connecting the elements.

Here, the beacon device 900 transmits and receives a beacon signal through short-range wireless communication such as BLE, WiFi, etc. Then the user terminal device 100 in the vicinity receives the beacon signal. When the beacon signal is received, the user terminal device 100 transmits information (e.g., a universally unique identifier (UUID), received signal strength, etc.) included in the beacon signal to the service device 400 through the communications network 500. The service device 400 stores service information (i.e., coupons, discount information, advertisement information, etc.) for each beacon device 900, transmits service information of the beacon device 900 corresponding to the information transmitted from the user terminal device 100, and allows the service information to be output to a user through the user terminal device 100.

While the user terminal device 100 receives the information included in the beacon signal from the beacon device 900 and transmits the received information to the service device 400 through the communications network 500, service traffic is generated in the beacon device 900.

The user terminal device 100 refers to a user device that may connect to a wireless communications network provided according to the present invention to transmit and receive various types of data. Here, "terminal" may be replaced by "user equipment (UE)," "mobile station (MS)," "mobile subscriber station (MSS)," "subscriber station (SS)," "advanced mobile station (AMS)," "wireless terminal (WT)," "machine-type communication (MTC) device," "machine-to-machine (M2M) device," "device-to-device (D2D) device," "station (STA)," or the other terms.

However, the present invention is not limited thereto. A device connected to a wireless communications network provided in the present invention may correspond to a term "terminal" used herein. A unit with a level similar to the above units may be used as the user terminal device 100 according to the present invention. The user terminal device 100 may perform voice or data communication using the wireless communications network provided according to the present invention. The user terminal device 100 according to the present invention may include a browser for transmitting and receiving information, a memory for storing a program and a protocol, a microprocessor for performing arithmetic and control operations by executing a variety of types of programs, etc.

The user terminal device 100 according to an embodiment of the present invention may be implemented in various forms. For example, a mobile terminal to which wireless communication technology is applied, such as a smartphone, a tablet PC, a personal digital assistant (PDA), a portable multimedia player (PMP), and an MP3 player, may be used as the user terminal device 100 described in the specification. The user terminal device 100 may perform voice or data communication through the communications network 500. The user terminal device 100 according to the present invention may include a browser for transmitting and receiving information, a memory for storing a program and a protocol, a microprocessor for performing arithmetic and controlling operations by executing a variety of types of programs, etc.

In particular, the user terminal device 100 according to an embodiment of the present invention may be a terminal capable of Bluetooth communication (e.g., Bluetooth 4.0, i.e., Bluetooth low energy (hereinafter referred to as BLE)). The user terminal device 100 may receive a beacon signal transmitted from the beacon device 900 through BLE communication and also receive a beacon signal produced based on WiFi, and thus may perform predetermined processing. In addition, the predetermined processing may also be performed through bidirectional communication with WiFi or other wireless access points (APs).

The user terminal device 100 may use a service that is intended to be provided by a manager of the service device 400 through the beacon device 900 and the service device 400.

Describing the beacon device 900, each of a plurality of beacon devices 900 refers to a device installed at a predetermined location to provide a typical beacon service and configured to periodically transmit a beacon signal.

Here, the beacon signal may include beacon identification information such as unique identification information or location information allocated to the beacon device 900. Here, the beacon identification information is a criterion for the user terminal device 100 to receive the beacon service.

In detail, when the user terminal device 100 located within a communications coverage receives the beacon signal transmitted from the beacon device 900, the user terminal device 100 transmits a service request including beacon identification information extracted from the beacon signal to the service device 400, and then the service device 400 provides service information (e.g., coupons, discount information, advertisement information, service pages, etc.) corresponding to the beacon identification information to the user terminal device 100. Then, the user terminal device 100 may receive and output the service information to allow the user to check the service information.

For a BLE beacon, the beacon identification information used for the beacon service may be a unique value including a universally unique identifier (UUID), a major/minor version, and signal strength of the BLE beacon.

For a WiFi beacon, the identification information may be a unique value including a basic service set identifier (BSSID), a frequency, and signal strength for each WiFi. The BSSID refers to an identifier or network ID having 48 bits, which is used to identify a basic service area in the 802.11 WLAN standards. Typically, the BSSID refers to a media access control (MAC) address of an AP device. For an independent BBS or an ad-hoc network, the BSSID may be generated with any value.

The BLE and the WiFi have been described as an example. As described above, the wireless communication method of the beacon device 900 according to an embodiment of the present invention is not limited thereto.

In addition, the beacon device 900 according to an embodiment of the present invention periodically transmits a state check massage to the service device 400. The state check message may include identification information of the beacon device 900 that has transmitted the state check message.

A detailed configuration of the beacon device 900 according to an embodiment of the present invention will be described below in further detail.

The service device 400 is an element for providing a service to a user through a network. The service device 400 may receive a service packet requested from the user terminal device 100. In response to the received packet, the service device 400 may transmit a response packet to the user terminal device 100 that has transmitted the service packet. Also, the service device 400 may control the beacon device 900 through the communications network 500.

The service device 400 may be a Web Application Server (WAS), an Internet Information Server (IIS), or a well-known web server or cache server on the Internet that uses Apache, Tomcat, or Nginx. In addition, one of the devices shown as constituting a network computing environment may be the service device 400 according to an embodiment of the present invention. Also, the service device 400 may support an operating system (OS) such as Linux or Windows and may execute a received control instruction. However, the service device 400 may include a program module implemented using a software language such as C, C++, Java, Visual Basic, Visual C, etc.

In particular, the service device 400 according to an embodiment of the present invention monitors service traffic generated for each beacon device and determines a state of the beacon device according to a variation of the service traffic.

An operation of the service device 400 will be described below in detail. According to a first embodiment of the present invention, the service device 400 monitors service traffic being transmitted by a request of the user terminal device 100 that has recognized a nearby beacon and collects statistical data about the service traffic for each beacon.

Then, the service device 400 compares the collected statistical data about the service traffic in a normal state for each beacon device with service traffic for each beacon device being currently monitored, checks a variation of the service traffic, and determines whether each beacon device operates abnormally according to the variation.

In this case, there are two methods in which the service device 400 determines whether the beacon device operates abnormally. First, the service device 400 compares the service traffic being currently monitored with the statistical data about the service traffic in the normal state. When a difference between the currently monitored service traffic and the statistical data about the service traffic is equal to or greater than a first reference value, the service device 400 determines that a corresponding beacon device is contaminated. That is, the service device 400 continuously compares the service traffic generated for each beacon device with the statistical data in the normal state. When the service traffic rapidly decreases compared to the statistical data, the service device 400 determines that the beacon device is in an abnormal state, that is, the beacon does not operate normally. Second, when the currently monitored service traffic is equal to or less than a second reference value, the service device 400 determines that the beacon device is in an abnormal state.

According to a second embodiment of the present invention, the service device 400 may control the beacon device 900, periodically receive a state check message from the beacon device 900, and examine whether service traffic of the beacon device 900 is valid. In addition, the service device 400 may enable the beacon device 900 to perform a channel change or may perform control such that a connection form between beacon devices 900 is changed.

In the present invention, the abnormal state of the beacon device refers to a case in which the beacon device is contaminated due to hacking, etc. and prevented from operating normally to transmit service information that is different from the original service information to a user for a malicious purpose or a case in which the beacon device does not operate normally due to a failure or a case in which interference has occurred, etc.

A detailed configuration of the service device 400 according to an embodiment of the present invention will be described below in detail.

Furthermore, the service device 400 according to the present invention may be connected with the user terminal device 100 that may carry out the present invention through the communications network 500. The communications network 500 refers to a network, such as an Internet network, an Intranet network, a mobile communications network, or a satellite communications network, in which data are transmitted and received in the Internet protocol using various wired or wireless communications technologies. In addition, the communications network 500 is combined with the service device 400 or the user terminal device 100 and configured to store computing resources such as hardware or software. The communications network 500 is a concept that collectively refers to networks such as a code division multiple access (CDMA) network, a wideband code division multiple access (WCDMA) network, a global system for mobile communications (GSM) network, a long term evolution (LTE) network, and an evolved packet core (EPC) network, and next generation networks and computing networks that will be implemented in the future.

The beacon management device 800 is configured to manage at least one beacon device 900. In particular, in the present invention, the beacon management device 800 performs firmware upgrade on the beacon device 900.

The beacon management device 800 substantially performs an operation for the upgrade at a predetermined time after an upgrade progress notification message is transmitted to notify a beacon device 900 that the upgrade is scheduled.

In addition, the beacon management device 800 according to the present invention may be connected with the beacon device 900 that may be used to carry out the present invention through the communications network 500.

Moreover, the communications network 500 according to the present invention may be configured to include, for example, a plurality of access networks (not shown) and a plurality of core networks (not shown) and may further include an external network, for example, the Internet network (not shown). Here, each of the access networks (not shown) performs wired/wireless communication between the user terminal device 100 and the beacon device 900. For example, the access network may be implemented as a plurality of base stations (BSs) such as a base transceiver station (BTS), a NodeB, and an eNodeB and a base station controller (BSC) such as a radio network controller (RNC). Also, as described above, a digital signal processing unit and a wireless signal processing unit that were integrally implemented in the base station are separated into a digital unit (hereinafter referred to as a DU) and a radio unit (hereinafter referred to as an RU), respectively. A plurality of RUs (not shown) may be installed in a plurality of regions and may be connected with a centralized DU (not shown).

In addition, a core network (not shown) constituting a mobile network along with an access network (not shown) serves to connect the access network (not shown) with an external network, for example, the Internet network (not shown).

As described above, the core network (not shown) is a network system that performs main functions for mobile communications service which are mobility control and switching between access networks (not shown). The core network (not shown) is configured to perform circuit switching or packet switching and manage and control packet flow in the mobile network. In addition, the core network (not shown) may serve to manage mobility between frequencies and interoperate between traffic in the access network (not shown) and the core network (not shown) and another network, for example, the Internet network (not shown). The core network (not shown) may further include a serving gateway (SGW), a PDN gateway (PGW), a mobile switching center (MSC), a home location register (HLR), a mobile mobility entity (MME), and a home subscriber server (HSS).

In addition, the Internet network (not show) refers to a typical open communications network through which information is exchanged according to a TCP/IP protocol, that is, a public network. The Internet network (not shown) may be connected with the service device 400 and configured to provide a service provided from the service device 400 to the user terminal device 100 via the core network (not shown) and the access network (not shown) and provides service request information transmitted from the user terminal device 100 to the service device 400 via the core network (not shown) and the access network (not shown). Furthermore, the Internet network (not shown) may connect the service device 400 and the user terminal device 100 to enable a service to be provided using the beacon device 900.

A processor installed in each device according to an embodiment of the present invention may process a program instruction for executing the method according to an embodiment of the present invention. In one implementation, the processor may be a single-threaded processor. In other implementations, the processor may be a multi-threaded processor. Furthermore, the processor may also process instructions stored in a memory or a storage device.

The entire system that performs a method of detecting an abnormal state of a beacon device according to an embodiment of the present invention has been schematically described.

Next, a mesh network structure with the beacon device 900 at the center of the overall system that performs a method of detecting an abnormal state of a beacon device according to an embodiment of the present invention will be described below.

Figure 2:
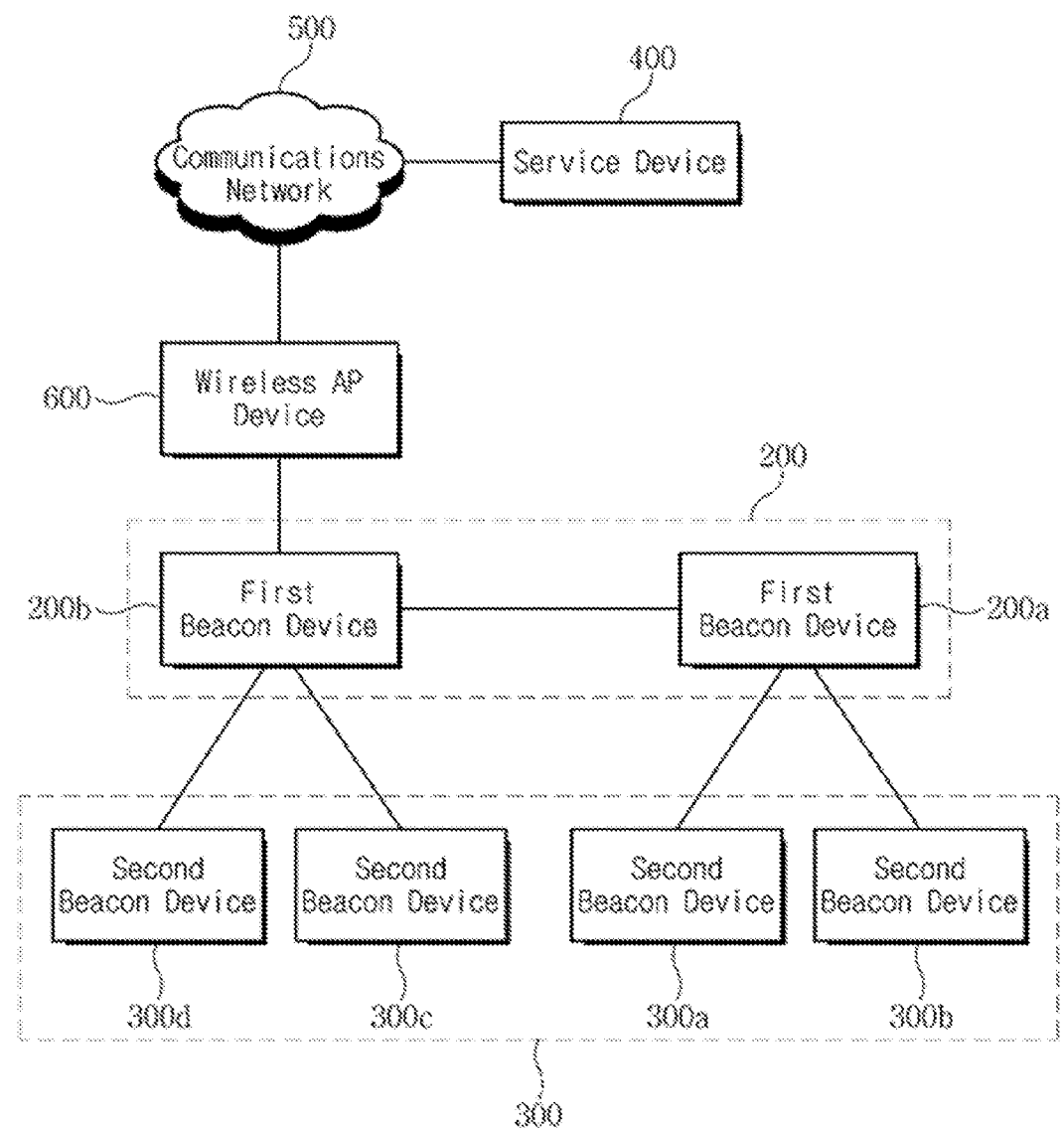
FIG. 2 is a block diagram schematically showing a wireless mesh network structure for performing a method of detecting an abnormal state of a beacon device according to an embodiment of the present invention.

FIG. 2 is a block diagram schematically showing a wireless mesh network structure for performing a method of detecting an abnormal state of a beacon device according to an embodiment of the present invention.

Referring to FIG. 2, the mesh network structure according to an embodiment of the present invention may include a communications network 500, a wireless AP device 600 connected to the communications network 500, a first beacon device 200 that may be connected to the wireless AP device 600, and a second beacon device 300 connected to the first beacon device 200.

The communications network 500 refers to a network capable of transmitting and receiving data in the Internet protocol using various wired/wireless communications technologies such as an Internet network, an Intranet network, a mobile communications network, a satellite communications network, etc., as described above. The structure of FIG. 1 serves as a passageway for connecting the user terminal device 100 and the service device 400 to provide a service. The structure of FIG. 2 serves as a passageway for connecting the service device 400 and the wireless AP device 600 to control one or more beacon devices 900.

The first beacon device 200 and the second beacon device 300 make up a kind of beacon device 900 and may be provided in plurality. The first beacon device 200 is a smart beacon connected to the wireless AP device 600. The smart beacon connects a plurality of dummy beacons such as the second beacon device 300 in a star structure based on BLE. The smart beacon may be established such that a dummy beacon having a WiFi function is accessible to the Internet through the smart beacon. A structural difference between the first beacon device 200 and the second beacon device 300 will be described later.

The second beacon device 300 is under the management of the first beacon device 200. In order to connect to a wired network, the first beacon device 200 is connected with the wireless AP device 600. The first beacon device 200 connected to the wireless AP device 600 is not determined to be a specific first beacon device 200. One or more first beacon devices 200 may be connected to the wireless AP device 600. On the other hand, there are a plurality of wireless AP devices 600 which may be connected with one or a plurality of first beacon devices 200.

Each of the first beacon devices 200 may manage a plurality of second beacon devices 300. Referring to FIG. 2, it can be seen that each of the first beacon devices 200a and 200b manages two second beacon devices 300a, 300b, 300c, and 300d.

The first beacon device 200 and the second beacon device 300 may be connected through pairing and bonding. The plurality of second beacon devices 300 may be connected to the first beacon device 200 in various manners including a star topology, a ring topology, etc.

In particular, according to the present invention, the first beacon device 200 may be connected with the second beacon device 300 over a short-range communication (e.g., PAN) and configured to transmit a predetermined command message or request message to the second beacon device 300 to manage and control the second beacon device 300.

Here, one first beacon device 200 is not necessarily connected with one second beacon device 300 to manage the second beacon device 300. One first beacon device 200 may manage a plurality of second beacon devices 300 and may be connected with another first beacon device 200 through a short-range communications network (PAN).

In this case, in order to carry out the present invention, a short-range communication method between the first beacon devices 200 and a short-range communication method between the first beacon device 200 and the second beacon device 300 may be configured or adopted differently from each other.

Also, the first beacon device 200 may be controlled by the service device 400 through the communications network 500.

The first beacon device 200 may be classified into an upper layer and a lower layer. Here, the upper layer refers to a first beacon device 200b that is located closer to the first AP device 600 than the specific first beacon device 200a in a connection step with respect to the specific first beacon device 200a. On the other hand, when a first beacon device is located farther from the first AP device 600 than the specific first beacon device 200a, the first beacon device is defined as belonging to the lower layer.

In addition, with respect to a reference beacon device, a beacon device belonging to the upper layer of the reference beacon device is referred to as a parent node, a beacon device belonging to the lower layer of the reference beacon device is referred to as a child node, and a beacon device belonging to the same layer as that of the reference beacon device is referred to as a brother node.

Specific configuration of each of the first beacon device 200 and the second beacon device 300 according to an embodiment of the present invention will be described below in further detail.

The wireless AP device 600 may be connected to the first beacon device 200 to allow beacon devices 900 that are wirelessly connected to access the communications network and allow a mesh-type network structure of a wired network to be implemented even in a wireless network.

The beacon management device 800 substantially performs an operation for the upgrade at a predetermined time after an upgrade progress notification message is transmitted to notify a beacon device 200 that the upgrade is scheduled.

When there is a beacon device that malfunctions or does not operate among a plurality of beacon devices in a mesh-type network, a user terminal located in the vicinity of the beacon device does not receive the corresponding service.

In particular, when a smart beacon that manages even the dummy beacons malfunctions or does not operate, it is also difficult for the dummy beacons connected to the smart beacon to operate normally, and this makes the problem worse.

The mesh network structure with the beacon device 900 at the center of the overall system that performs a method of detecting an abnormal state of a beacon device according to an embodiment of the present invention has been described.

Structures of the first beacon device 200 and the second beacon device 300 that perform a method of detecting an abnormal state of a beacon device according to an embodiment of the present invention will be described below with reference to FIGS. 3 and 4.

Figure 3:
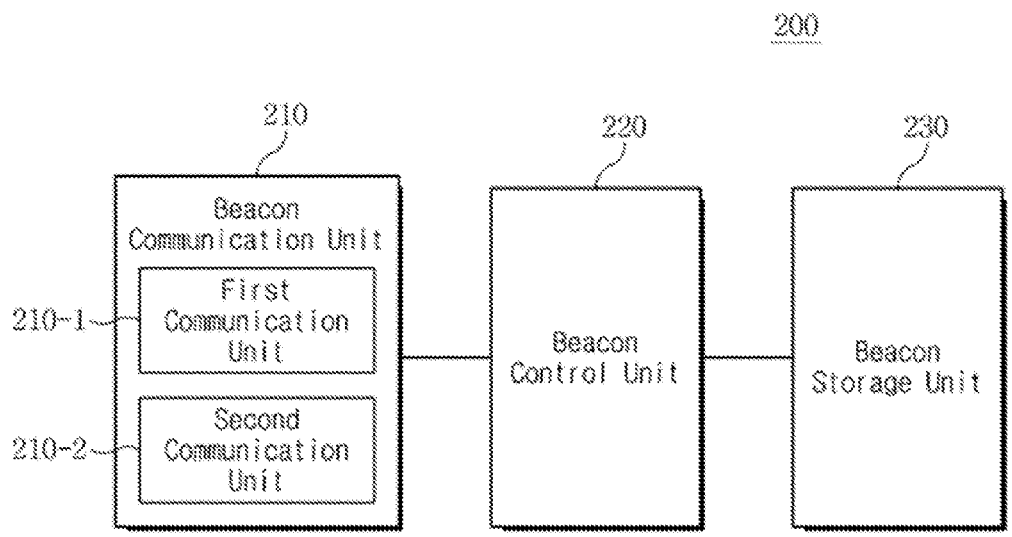
FIG. 3 is a block diagram showing a structure of a first beacon device according to an embodiment of the present invention.

FIG. 3 is a block diagram showing a structure of a first beacon device according to an embodiment of the present invention.

Referring to FIG. 3, the first beacon device 200 according to an embodiment of the present invention may be configured to include a beacon communication unit 210, a beacon control unit 220, and a beacon storage unit 230.

The beacon communication unit 210 is a means for receiving data from external sources and transmitting data to external sources. The beacon communication unit 210 may be represented in a logical combination of one or more software and/or hardware modules such as, for example, a network interface card and a corresponding Network Driver Interface Specification (NDIS) stack. The beacon communication unit 210 may support various communications protocols. For example, the beacon communication unit 210 may support various mobile communications standards such as Advanced Mobile Phone System (AMPS), Code Division Multiple Access (CDMA), Global System for Mobile Communications (GSM), Wideband Code Division Multiple Access (WCDMA), High-Speed Downlink Packet Access (HSDPA), Long Term Evolution (LTE) and, LTE Advanced (LTE-A), and also short-range wireless network technologies such as Bluetooth low energy (BLE) and Zigbee. In addition, the beacon communication unit 210 may also support wired communications standards including Ethernet, Home PNA, Power Line Communication (PCL), etc.

The beacon communication unit 210 may be connected with another first beacon device and includes a first communication unit 210-1 that is connected to the wireless AP device 600 and configured to communicate with the service device 400 or the beacon management device 800 through the communications network 500. The first communication unit 210-1 serves to transmit a state check message to the service device 400 through the communications network 500 via a first beacon device 200 in an upper layer and the wireless AP device 600.

As such, the first communication unit 210-1 may preferably use wireless communication methods including Wireless LAN (WLAN), Wi-Fi, Wibro, Wimax, and High Speed Downlink Packet Access (HSDPA), etc. However, the present invention is not limited thereto, and thus the first communication unit 210-1 may use wired communication methods including Ethernet, an x digital subscriber line (xDSL) (asymmetric DSL (ADSL), very-high-bot-rate DSL (VDSL)), hybrid fiber coaxial cable (HFC), fiber to the curb (FTTC), and fiber to the home (FTTH), etc. according to a system implementation method.

Also, the beacon communication unit 210 includes a second communication unit 210-2 configured to transmit and receive a wireless connection maintenance signal and various kinds of data to and from the second beacon device 300. Here, the second communication unit 210-2 may perform personal area network (PAN) type communication including Bluetooth.

The beacon control unit 220 is configured to perform an overall control of the first beacon device 200 and may include one or more processors. Each of the processors may be a single-threaded processor, and in alternative implementations, the processor may be a multithreaded processor. Furthermore, the beacon control unit 220 may operate by processing an instruction stored in the beacon storage unit 230 through the one or more processors. In this case, the instruction may, for example, include interpreted instructions such as script instructions, e.g., JavaScript or ECMAScript instructions, or executable code or other instructions stored in a computer readable medium. The beacon control unit 220 transmits a beacon signal including a preset beacon identification number.

The beacon control unit 220 controls the first beacon device 200 to transmit the state check message to the service device 400 at predetermined intervals.

In addition, when a request to measure service traffic is received from the service device 400, the beacon control unit 220 may measure its amount of service traffic and transmit the measured amount of service traffic to the service device 400 through the communications network 500.

In addition, when an instruction to change the current connection is received from the service device 400, the beacon control unit 220 may control the first communication unit 210-1 and the second communication unit 210-2 to execute the instruction.

In addition, when an upgrade progress notification message is received from the beacon management device 800 through the beacon communication unit 210, the beacon control unit 220 transmits an upgrade schedule notification message to a child beacon device having the first beacon device 200 as a parent beacon device. Subsequently, the beacon control unit 220 performs an upgrade based on data for the upgrade provided from the beacon management device 800.

Also, when the upgrade is completed, the beacon control unit 220 confirms information regarding the child beacon device in order to inform the child beacon device that the upgrade is completed and thus reconnection is allowed. Subsequently, when an upgrade completion notification message is transmitted to the confirmed child beacon device, the beacon control unit 220 performs control to form a network with the child beacon device again according to a reconnection request from the child beacon device.

The beacon storage unit 230 is configured to store data or a program that is executed or processed by the beacon control unit 220. Basically, the beacon storage unit 230 may store an operating system (OS) for booting the first beacon device 200 and operating the above-described elements, an application program for performing a user function for supporting a distributed function of the first beacon device 200, etc.

In particular, according to the present invention, the beacon storage unit 230 may register information regarding another first beacon device or the second beacon device 300 that is located in the vicinity. This information includes location information of the beacon device 900. Information regarding nearby wireless AP devices 600 may also be stored. When the first beacon device 200 has a transmission failure during communication with a device to which the first beacon device 200 is connected, the information regarding the beacon device 900 or the information regarding the wireless AP devices 600 may serve as a preliminary list with available substitute connection capable targets.

The beacon storage unit 230 includes a main memory device and a secondary memory device in the form of a magnetic medium such as a hard disk, a floppy disk, and a magnetic tape, an optical medium such as a compact disk read only memory (CD-ROM) and a digital video disk (DVD), a magneto-optical medium such as a floptical disk, a read only memory (ROM), a random access memory (RAM), and a flash memory, etc. The beacon storage unit 230 may largely include a program area and a data area.

The first beacon device 200 according to an embodiment of the present invention has been described.

Next, the second beacon device 300 according to an embodiment of the present invention will be described.

Figure 4:
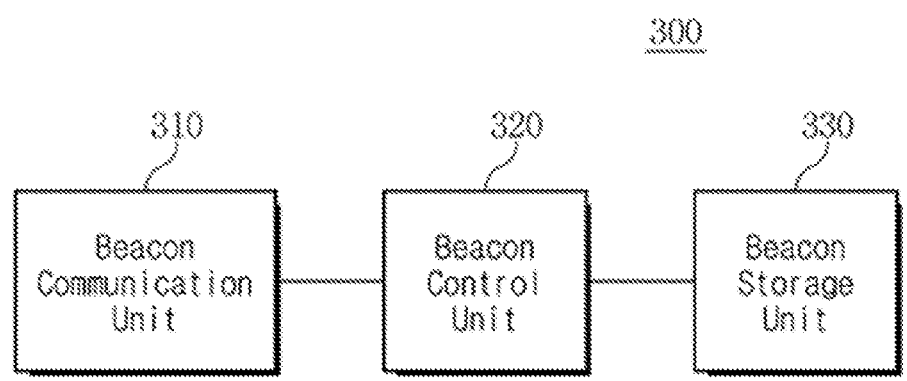
FIG. 4 is a block diagram showing a structure of a second beacon device according to an embodiment of the present invention.

FIG. 4 is a block diagram showing a structure of a second beacon device according to an embodiment of the present invention.

Referring to FIG. 4, the beacon device 300 includes a beacon communication unit 310, a beacon control unit 320, and a beacon storage unit 330.

The beacon communication unit 310 is a means for receiving data from external sources and transmitting data to external sources. The beacon communication unit 310 may be represented in a logical combination of one or more software and/or hardware modules such as, for example, a network interface card and a corresponding Network Driver Interface Specification (NDIS) stack.

In particular, according to the present invention, the beacon communication unit 310 periodically or aperiodically transmits and receives a wireless connection maintenance signal and various kinds of data to and from the first beacon device 200.

In addition, the beacon communication unit 310 transmits a state check message to the first beacon device 200 to which the beacon communication unit 310 is connected, thus allowing the first beacon device 200 to transfer the state check message to the service device 400 through the communications network 500 via a first beacon device 200 in an upper layer and the wireless AP device 600. The beacon communication unit 310 may perform personal area network (PAN) type communication including Bluetooth.

The beacon control unit 320 is configured to perform an overall control of the second beacon device 300 and may include one or more processors. Each of the processors may be a single-threaded processor, and in alternative implementations, the processor may be a multithreaded processor. Furthermore, the beacon control unit 220 may operate by processing an instruction stored in the beacon storage unit 330 through the one or more processors. In this case, the instruction may, for example, include interpreted instructions such as script instructions, e.g., JavaScript or ECMAScript instructions, or executable code, or other instructions stored in a computer readable medium. The beacon control unit 320 transmits a beacon signal including a preset beacon identification number.

The beacon control unit 320 performs control such that the second beacon device 300 transmits the state check message to the service device 400 at predetermined intervals.

In addition, when an instruction to change the current connection is received from the service device 400, the beacon control unit 320 may control the beacon communication unit 310 to execute the instruction.

In addition, when an upgrade process notification message is received from the first beacon device 200 which is a parent beacon device, the beacon control unit 320 searches for an available beacon device other than the parent beacon device that is currently connected, requests connection to an available beacon device, and connects to the available beacon device and the network according to whether the request is approved.

Subsequently, when an upgrade completion notification message is received from the parent beacon device through the beacon communication unit, the beacon control unit 320 performs an operation to disconnect from the beacon device to which a connection is made and then requests network connection from the parent beacon device in order to reconnect to the parent beacon device.

The beacon storage unit 330 is configured to store data or a program that is executed or processed by the beacon control unit 320. Basically, the beacon storage unit 330 may store an operating system (OS) for booting the second beacon device 300 and operating the above-described elements, etc.

The beacon storage unit 330 includes a main memory device and a secondary memory device, in the form of a magnetic medium such as a hard disk, a floppy disk, and a magnetic tape, an optical medium such as a compact disk read only memory (CD-ROM) and a digital video disk (DVD), a magneto-optical medium such as a floptical disk, a read only memory (ROM), a random access memory (RAM), and a flash memory, etc. The beacon storage unit 330 may largely include a program area and a data area.

The second beacon device 300 according to an embodiment of the present invention has been described.

Figure 5:
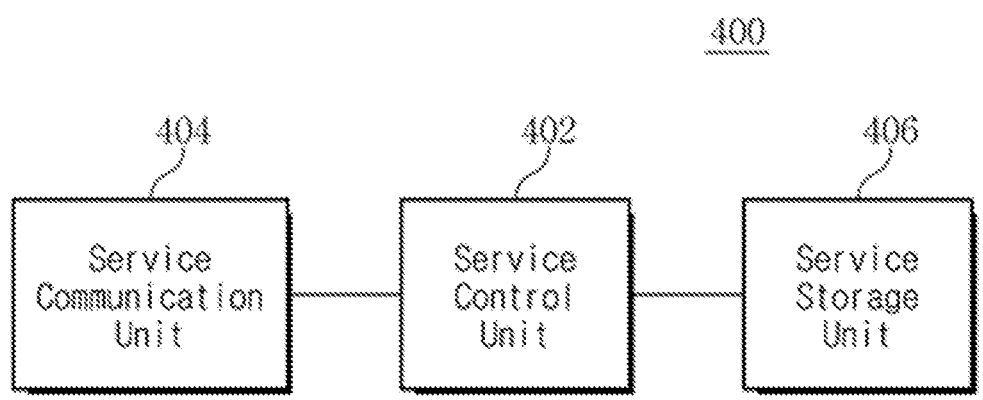
FIG. 5 is a block diagram showing a structure of a service device according to an embodiment of the present invention.

FIG. 5 is a block diagram showing a structure of a service device according to an embodiment of the present invention.

Referring to FIG. 5, the service device 400 according to an embodiment of the present invention may include a service control unit 402, a service communication unit 404, and a service storage unit 406.

The service control unit 402 is configured to perform an overall control of the service device 400 and may be supported by one or more processors. Each of the processors may be a single-threaded processor, and in alternative implementations, the processor may be a multithreaded processor. Furthermore, the service control unit 402 may operate by processing an instruction stored in the service storage unit 406 through the one or more processors. In this case, the instruction may, for example, include interpreted instructions such as script instructions, e.g., JavaScript or ECMAScript instructions, or executable code, or other instructions stored in a computer readable medium.

In a first embodiment of the present invention, the service control unit 402 collects statistical data about the service traffic in a normal state for each beacon device and stores an average amount of service traffic for each beacon device. Subsequently, the service control unit 402 monitors the amount of service traffic for each beacon device.

In addition, the service control unit 402 confirms a service that is stored in correspondence to the beacon identification information according to a beacon-identification-information-based service request from the user terminal device 100, and provides the confirmed service to the user terminal device 100.

In addition, when a beacon device whose amount of service traffic decreases rapidly is discovered while the amount of service traffic for each beacon device is monitored by the service control unit 402, the service control unit determines that the beacon device has a failure. That is, the service control unit 402 according to the present invention monitors the amount of service traffic generated for each beacon device and determines whether the beacon device is in an abnormal state according to a variation of the service traffic.

In this case, the method of determining whether the beacon device is in an abnormal state according to a variation of the service traffic may include comparing the average amount of service traffic in a normal state for the beacon device during a predetermined time with the amount of service traffic generated based on the beacon identification number and determining that the beacon device is in the normal state when the generated amount of service traffic is smaller than the average amount of service traffic or when the service traffic based on the beacon identification number corresponding to the beacon device is not generated during a predetermined time.

According to a second embodiment of the present invention, when the state check message is not received from the beacon device 900 for a predetermined period or more, the service control unit 402 examines whether the service traffic generated corresponding to the beacon device 900 is valid. Here, the service traffic of the beacon device 900 may be generated by communicating with another beacon device 900 or receiving a signal from the user terminal device 100. For example, service traffic corresponding to the beacon device 900 may be generated between the user terminal device 100 and the service device 400 by the user terminal device 100 that has received a beacon signal transmitted from the beacon device 900. The service traffic caused by the user terminal device 100 may be represented as the number of user terminal devices 100 that receive a signal of the beacon device 900 that transmits the state check message.

The service traffic may be collected by the first beacon device 200 and may be transmitted to the service device 400. In addition, while a service is being received, the user terminal device 100 may receive the beacon signal and transmit identification information of the beacon device 900 from which the beacon signal is received. The service control unit 402 may recognize which user terminal device 100 is connected to which beacon device 900 through the identification information and thus may find service traffic for each beacon device 900.

The predetermined period may be arbitrarily set by a manager of the service device 400. It is also possible to perform settings to examine whether the service traffic is valid when the state check message is not received a specified number of times or more.

The examination process may be performed by the service control unit 402 of the service device 400 checking the amount of service traffic being currently generated corresponding to the beacon device 900 from which the state check message has not been received for a predetermined period or more and then comparing the amount of service traffic being currently generated with the predetermine reference amount of service traffic.

The predetermined reference amount of service traffic may be set based on a result of measuring the average amount of service traffic generated in a normal state corresponding to the beacon device. Also, the predetermined reference service traffic may be set to measure a change in traffic in a normal state for each beacon device and determine that the service traffic is in a normal state when the traffic change is in the range of a predetermined traffic variation. The service control unit 402 may set the reference amount of service traffic in consideration of the average amount of service traffic and may set a reference value for determining whether the beacon device 900 has a failure or interference has occurred in the beacon device 900 based on the predetermined traffic variation range.

When the amount of service traffic is within a normal range, the service control unit 402 determines that the service traffic is valid. When the amount of service traffic falls outside the normal range, the service control unit 402 determines that the service traffic is not valid.

When whether the service traffic is valid is measured, the service control unit 402 determines whether the beacon device 900 has a failure or interference has occurred based on the measurement. As an example of the determination method, when the currently generated amount of service traffic that is measured by examining whether the service traffic is valid has decreased from the reference amount of service traffic by the reference value or more, the service control unit 402 may determine that the beacon device 900 has a failure. When the currently generated amount of service traffic has not decreased from the reference amount of service traffic by the reference value or more, the service control unit 402 may determine that the decrease is caused by interference.

When the beacon device 900 has a failure, a beacon signal is not normally transmitted from the beacon device 900. Thus, a service request corresponding to the beacon signal is not generated by a nearby user terminal device 100. As a result, service traffic is hardly generated by the beacon device 900.

On the other hand, when interference occurs in a wireless connection channel of the beacon device 900, the beacon signal is normally transmitted from the beacon device 900. When the beacon signal is received, a service request is normally made by the user terminal device 100. The interference may be determined based on such a principle.

According to a second embodiment of the present invention, the service control unit 402 may notify a manager of the service device 400 about failure occurrence when it is determined that the beacon device 900 has a failure. The notification may be performed through a separate output device (not shown) or by transmitting a user message.

The output device (not shown) may be a display or an audio device that is connected with the service device 400 or may be a computing device that is separately installed and configured to manage the service device 400.

When the user message is transmitted, a setting file collection completion message may be transferred using Short Messaging Service (SMS), Multimedia Messaging Service (MMS), a mobile messenger, or a separate computer program written to carry out the present invention.

According to a second embodiment of the present invention, when it is determined that interference occurs in the beacon device 900, the service control unit 402 may transmit a command to adjust the connection state of the beacon device 900.

Here, the service control unit 402 may generate a command to instruct the beacon device 900 in which interference is occurring to change its transmission channel and instruct the service communication unit 404 to transfer the command to the beacon device 900.

When the beacon device 900 is a first beacon device 200 that is connectable to the wireless AP device 600, the command that may be generated by the service control unit 402 may be a command for releasing a current connection to another beacon device 900 and then directly connecting to the wireless AP device 600. Alternatively, the command may also be a command for connecting to another first beacon device 200 rather than the wireless AP device 600.

When interference has occurred in the second beacon device 300, the second beacon device 300 cannot connect directly to the wireless AP device 600. Thus, the service control unit 402 may generate a command for connecting to another first beacon device 200 rather than the currently connected first beacon device 200.

The service communication unit 404 is a means for receiving data from external sources and transmitting data to external sources. The service communication unit 404 connects to the wireless AP device 600 through the communications network 500. Thus, the service communication unit 404 is connected with the beacon device 900 to perform communication. Also, the service communication unit may serve to support transmission and reception of information to and from the user terminal device 100, periodically receive a state check message from the beacon device 900, and collect information regarding the amount of traffic of the beacon device 900.

The service storage unit 406 is configured to store information regarding one or more beacon devices 900 constituting a mesh network. Also, the service storage unit 406 may store information regarding available wireless AP devices and may store an average amount of service traffic in a normal state for each beacon device 900. In addition, the service storage unit 406 may store information regarding channels that may be changed by the beacon device 900 and may store information regarding the state check message that is received through the service communication unit 404.

A detailed operation of the service device 400 according to an embodiment of the present invention may be more clearly understood with reference to the following flowchart.

Figure 6:
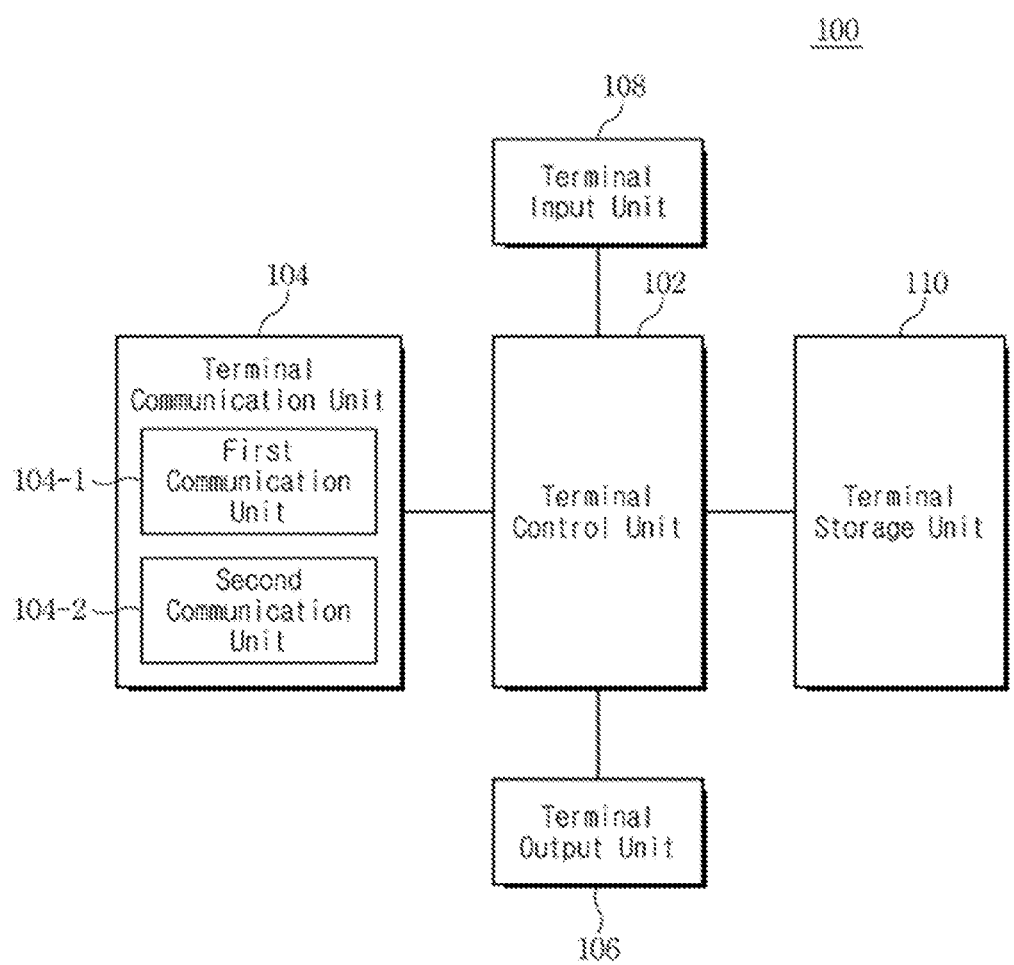
FIG. 6 is a block diagram showing a structure of a user terminal device according to an embodiment of the present invention.

FIG. 6 is a block diagram showing a structure of a user terminal device according to an embodiment of the present invention.

Referring to FIG. 6, a user terminal device 100 according to the present invention may include a terminal control unit 102, a terminal communication unit 104, a terminal output unit 106, a terminal input unit 108, and a terminal storage unit 110.

The terminal control unit 102 may be a processing device that drives an operating system (OS) and each element.

Accordingly, the terminal control unit 102 of the terminal device 100 may perform control to show a beacon signal received through the terminal communication unit 104 or information received from the service device 400 using the terminal output unit 106 and may perform control to store the information or data in the terminal storage unit 110.

The terminal communication unit 104 is used to transmit and receive data to and from the service device 400 through the communications network 500 and receive signals periodically transmitted by the beacon devices 200 and 300.

Also, the terminal communication unit 104 includes an RF transmitting means that up-converts a frequency of a transmitted signal and amplifies the transmitted signal, an RF receiving means that low-noise-amplifies a received signal and down-converts a frequency of the received signal, a data processing means that processes a communications protocol according to a specific communication method, etc.

The terminal communication unit 104 may include at least one of a wireless communication module (not shown) and a wired communication module (not shown). The wireless communication module is configured to transmit and receive data according to a wireless communication method. When the terminal device 100 uses wireless communication, the terminal device 100 may use any one of a wireless network communications module, a wireless LAN communication module, and a wireless PAN communication module to transmit and receive data to and from the service device 400.

Here, the terminal communication unit 104 includes a first communication unit 104-1 and a second communication unit 104-2.

The first communication unit 104-1 receives signals transmitted from the first and second beacon devices 200 and 300. Here, the first communication unit 104-1 may perform Personal Area Network (PAN) type communication including Bluetooth as described above.

The second communication unit 104-2 communicates with the service device 400 through the communications network 500. Here, as described above, the second communication unit 104-2 may use wireless communication methods such as Wireless LAN (WLAN), Wi-Fi, Wireless broadband (Wibro), World Interoperability for Microwave Access (Wimax), and High Speed Downlink Packet Access (HSDPA).

The terminal output unit 106 displays information about a series of operation states and operation results which are generated while functions of the terminal device 100 are performed. In addition, the terminal output unit 106 may display a menu of the terminal device 100, user data input by the user, etc. Here, the terminal output unit 106 may include a liquid crystal display (LCD), a thin film transistor LCD (TFT-LCD), a light emitting diode (LED), an organic LED (OLED), an active matrix OLED (AMOLED), a retina display, a flexible display, and a three-dimensional (3D) display. In this case, when the terminal output unit 106 is configured in the form of a touch screen, the terminal output unit 106 may perform some or all of the functions of the terminal input unit 108. The terminal output unit 106 may show service content received from the service device 400 to a user.

The terminal input unit 108 receives various pieces of information such as number and character information and transfers signals received related to set and control various functions of the terminal device 100 to the terminal control unit 102. In addition, the terminal input unit 108 may include at least one of a keypad and a touchpad, each of which generates an input signal according to a user's touch or manipulation. In this case, the terminal input unit 108 may be configured in the form of one touch panel (or touch screen) together with the terminal output unit 106 to perform an input function and a display function at the same time. Also, the terminal input unit 108 may include any type of input means that may be developed in the future in addition to an input device such as a keyboard, a keypad, a mouse, and a joystick.

The terminal storage unit 110 is a device for storing data. The terminal storage unit 110 includes a main memory device and a secondary memory device and stores an application program needed to operate a function of the user terminal device 100. The terminal storage unit 110 may largely include a program area and a data area. Here, when each function is activated upon a user's request, the user terminal device 100 executes a corresponding application program under the control of the terminal control unit 102 to provide each function.

The terminal storage unit 110 may store an operating system for booting the user terminal device 100, various application programs, user information matching the user terminal device 100, etc. The terminal storage unit 110 may also store a beacon service app for providing a beacon service according to the present invention.

The configuration and operation of the user terminal device 100 according to the present invention have been described.

Figure 7:
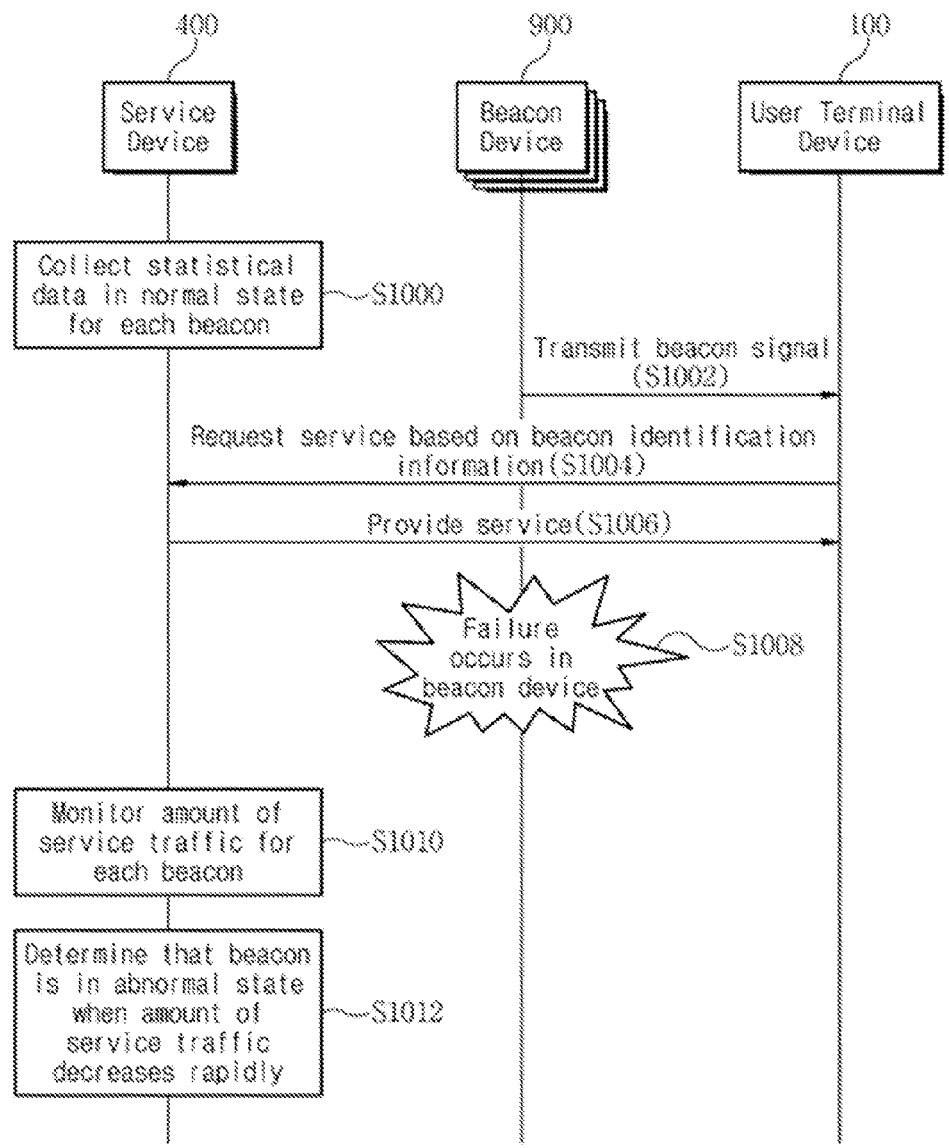
FIG. 7 is a flowchart showing flows of signals transmitted and received among a service device, a beacon device, a user terminal device in order to detect an abnormal state of the beacon device according to a first embodiment of the present invention.

FIG. 7 is a flowchart showing flow of signals transmitted and received among a service device, a beacon device, a user terminal device in order to detect an abnormal state of the beacon device according to a first embodiment of the present invention.

Referring to FIG. 7, first, the service device 400 collects statistical data about the service traffic in a normal state for each beacon device and stores an average amount of service traffic for each beacon device (S1000).

The beacon device 900 transmits a beacon signal including a beacon identification number that is set for a service (S1002).

Upon receiving the beacon signal, the user terminal device 100 requests the service from the service device 400 based on the beacon identification information included in the beacon signal (S1004).

Upon receiving the request for the service on the basis of the beacon identification information, the service device 400 confirms the service stored in correspondence to the beacon identification information and provides the confirmed service to the user terminal device 100 (S1006).

When the beacon device 900 operates normally as described above, the service may be normally provided through S1002 to S1006.

However, when the specific beacon device 900 has a failure, the beacon device 900 cannot transmit the beacon signal. Then, the service request based on the beacon identification number corresponding to the beacon device 900 with a failure may be stopped (S1008).

For this, the service device 400 monitors the amount of service traffic for each beacon device. When there is a beacon device whose amount of service traffic decreases rapidly, the service device 400 determines that the beacon device is in an abnormal state (S1010, S1012).

That is, the service device 400 monitors the amount of service traffic generated for each beacon device and determines whether the beacon device is in an abnormal state according to a variation of the amount of service traffic.

Figure 8:
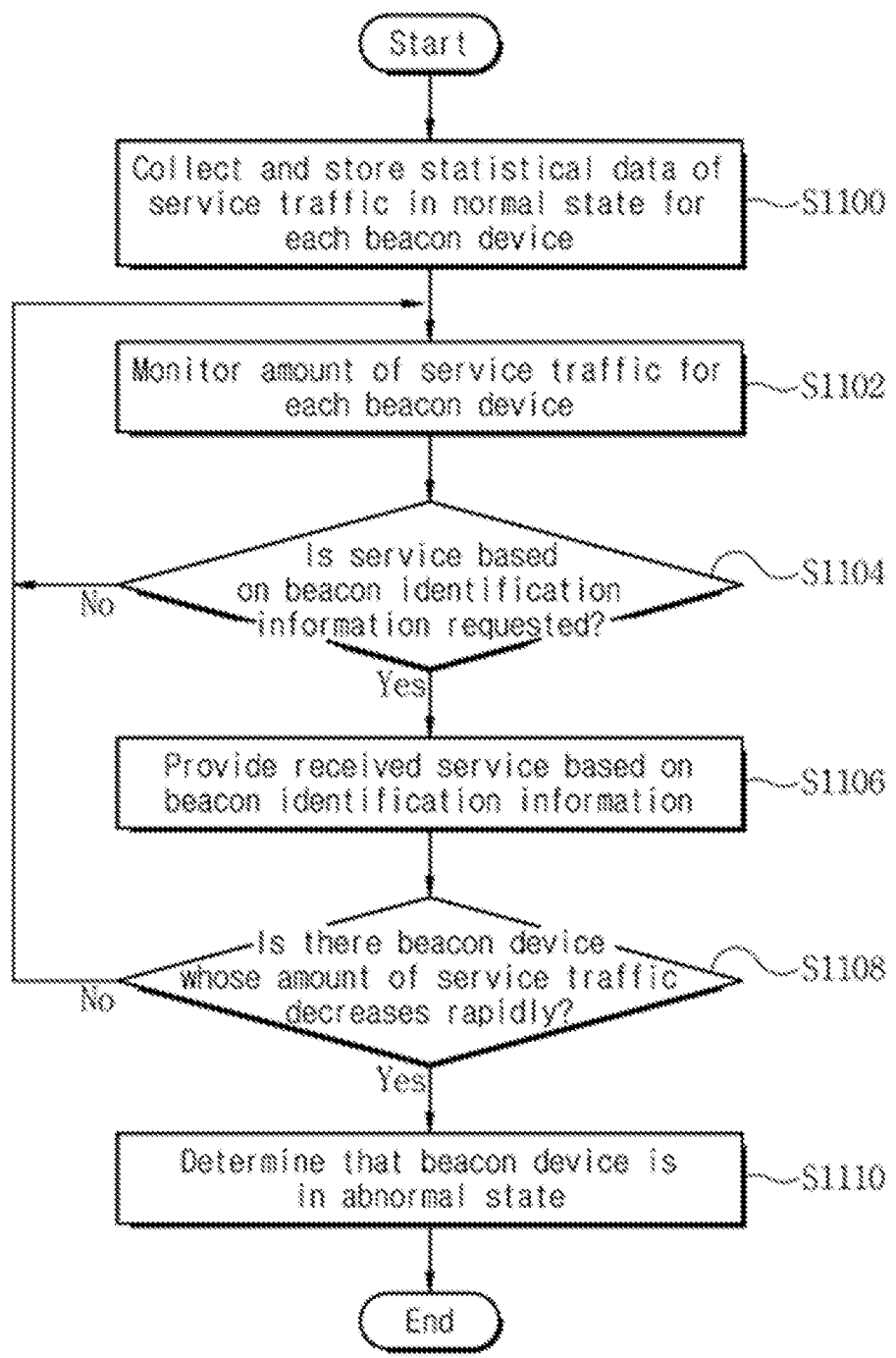
FIG. 8 is a flowchart showing a process of detecting an abnormal state of a beacon device using a service device according to a first embodiment of the present invention.

FIG. 8 is a flowchart showing a process of detecting an abnormal state of a beacon device using a service device according to a first embodiment of the present invention.

Referring to FIG. 8, the service device 400 collects statistical data about the service traffic in a normal state for each beacon device and stores an average amount of service traffic for each beacon device (S1100).

The service device 400 monitors the amount of service traffic for each beacon device (S1102).

Subsequently, when a service request based on beacon identification information is made from the user terminal device 100, the service device 400 confirms a service that is stored corresponding to the beacon identification information and provides the confirmed service to the user terminal device 100 (S1104, S1106).

In addition, when there is a beacon device whose amount of service traffic decreases rapidly while the service device 400 monitors the amount of service traffic for each beacon device, the service device 400 determines that the beacon device has a failure (S1108, S1110).

That is, the service device 400 according to the present invention monitors the amount of service traffic generated for each beacon device and determines whether the beacon device is in an abnormal state according to a variation of the service traffic.

In this case, in order to determine whether the beacon device is in an abnormal state according to a variation of the amount of service traffic, the service device 400 performs comparison with statistical data about the service traffic in a normal state and determines that the beacon device does not operate normally, that is, is in an abnormal state, when a difference with the currently monitored amount of service traffic is equal to or greater than a first reference value. That is, the service device 400 continuously compares the service traffic generated for each beacon device with the statistical data in the normal state. When the amount of service traffic rapidly decreases compared to the statistical data, the service device 400 determines that the beacon is contaminated or has a failure. Alternatively, when the currently monitored amount of service traffic is equal to or less than a second reference value, the service device 400 determines that the beacon device does not operate normally, that is, is in an abnormal state.

The method of detecting an abnormal state of a beacon device in a wireless mesh network according to an embodiment of the present invention has been described.

Figure 9:
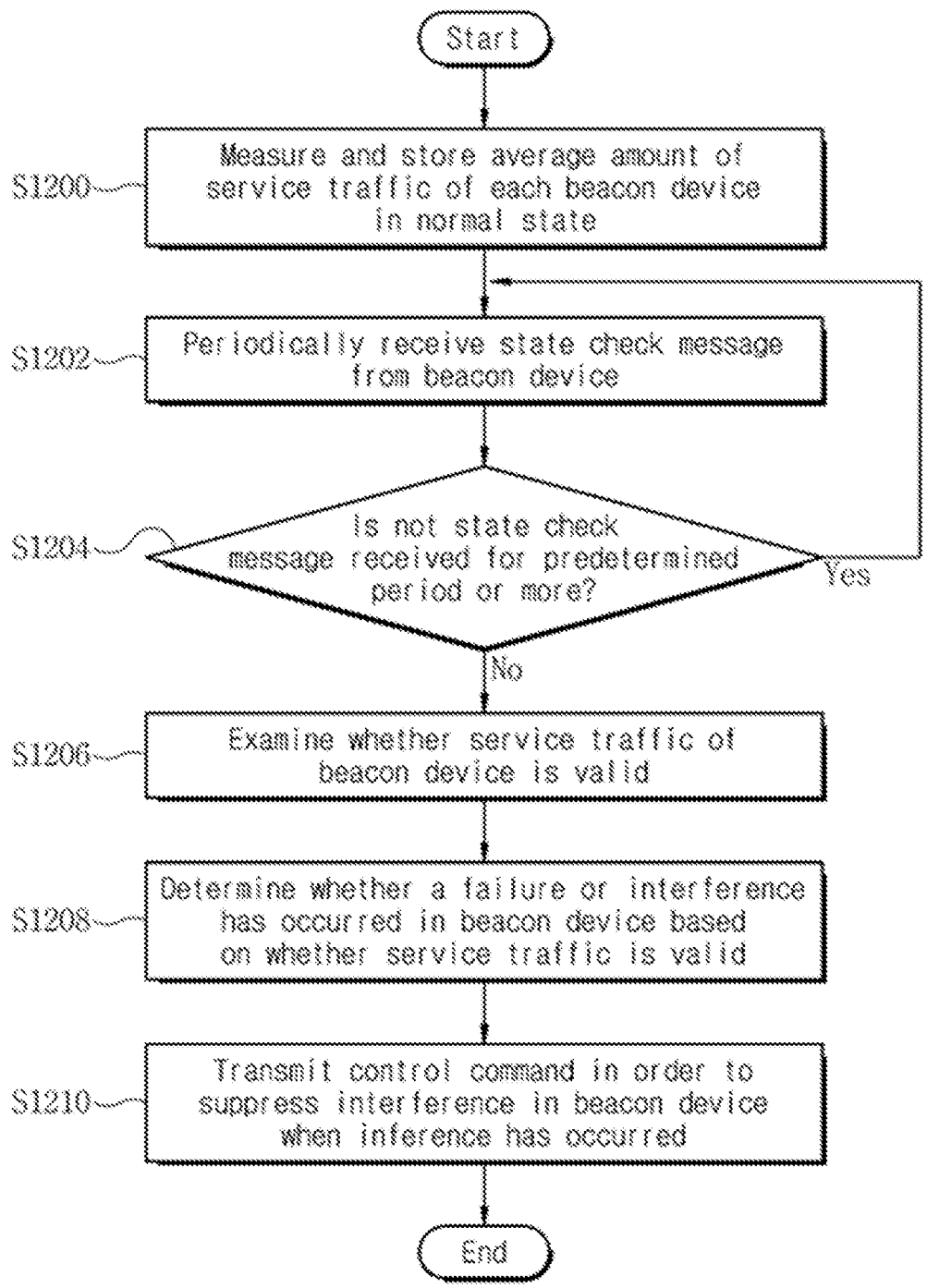
FIG. 9 is a flowchart showing a process of determining an abnormal state of a beacon device using a service device according to a second embodiment of the present invention.

FIG. 9 is a flowchart showing a process of determining an abnormal state of a beacon device using a service device according to a second embodiment of the present invention.

Referring to FIG. 9, first, the service device 400 measures the amount of service traffic in a normal state for each beacon device 900 and stores the measured amount of service traffic in the service storage unit 406. In this case, the amount of service traffic may be measured by the first beacon device 200 as described above or may be calculated by the service device 400 based on the information collected from the user terminal device 100.

Before or after this process, while the beacon device 900 operates in a normal state, the service device 400 periodically receives a state check message from the beacon device 900 (S1202). This process may be performed in parallel with process S1200. The state check message may include identification information of the beacon device 900 that has generated the state check message. When the state check message is received, it may be determined that the beacon device 900 operates normally. When the state check message is not received, it may be determined that a problem has occurred in the connection between the service device 400 and the beacon device 900.

While process S1202 is in progress, the state check message may not be received for a predetermined period or more (S1204). In this case, the service device 400 examines whether the service traffic of the beacon device 900 from which the state check message has not been received is valid (S1206). Whether the service traffic is valid may be examined by comparing the amount of service traffic being currently generated with a predetermined reference amount of service traffic.

When the validation of the service traffic is ended, the service device 400 determines whether the state check message of the beacon device 900 is not received for a predetermined period or more because of a failure of or interference in the beacon device 900 (S1208). This may be determined by considering whether the currently generated amount of service traffic has decreased by a reference or more from a predetermine reference amount of service traffic.

When it is determined that the interference has occurred, the service device 400 may transmit a control command to suppress the interference in the beacon device 900 (S1210). The control command is a command for instructing the beacon device 900 to change its transmission channel. Alternatively, the control command may be a command for releasing a current connection to another beacon device 900 and then connecting to the wireless AP device 600 directly or still another first beacon device 200 rather than the wireless AP device 600. When interference has occurred in the second beacon device 300, the second beacon device 300 cannot connect directly to the wireless AP device 600. Thus, the service device 400 may generate a command for connecting to another first beacon device 200 rather than the currently connected first beacon device 200.

Figure 10:
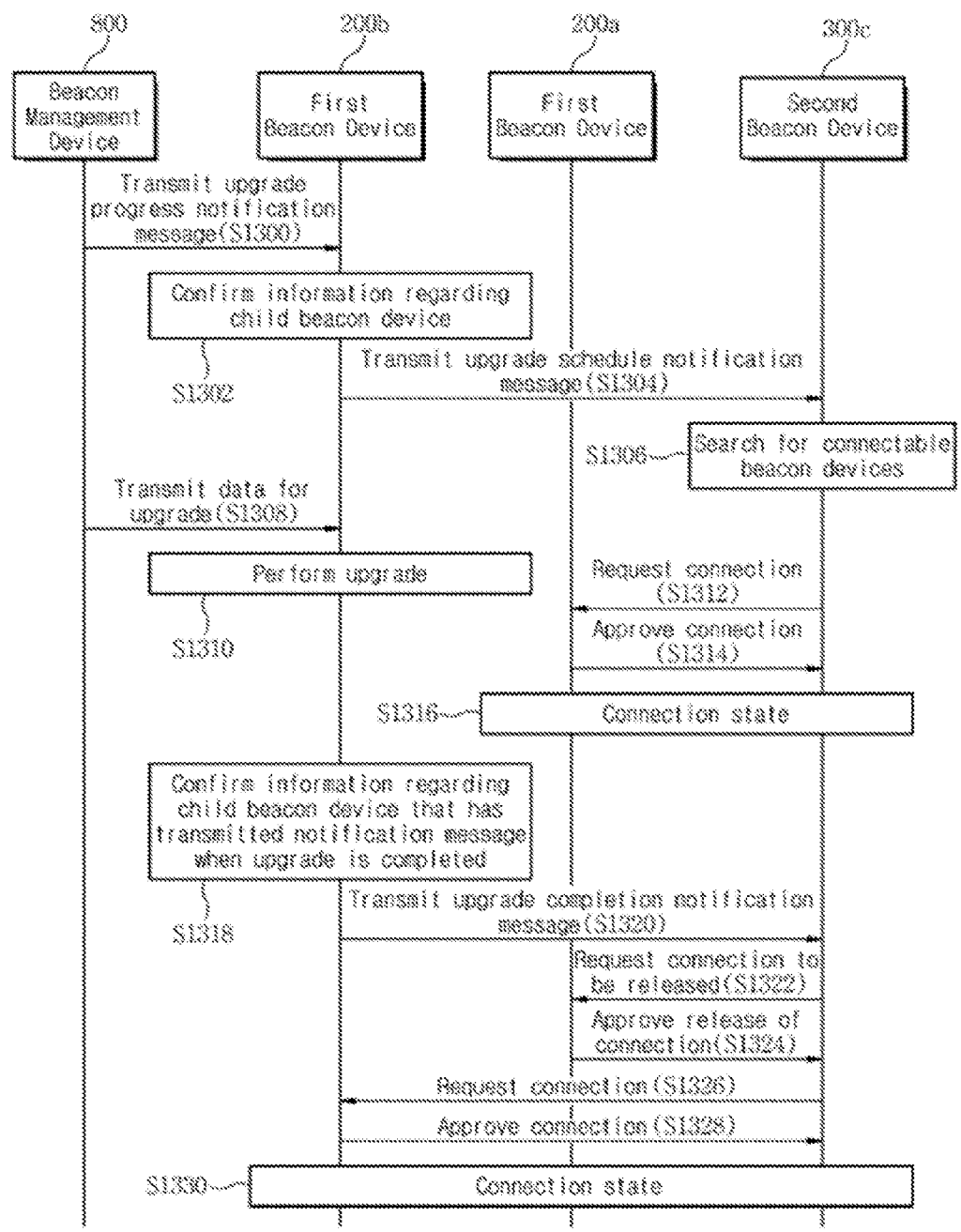
FIG. 10 is a flowchart showing flows of signals transmitted and received among a service device, a parent beacon device, a child beacon device in order to perform beacon upgrade according to a third embodiment of the present invention.

FIG. 10 is a flowchart showing flow of signals transmitted and received among a service device, a parent beacon device, a child beacon device in order to perform beacon upgrade according to a third embodiment of the present invention.

The following description will be made on the assumption that the first beacon device 200*b* is a beacon on which firmware upgrade is to be performed by the beacon management device 800 and the second beacon device 300*c* is a child beacon connected to the first beacon device 200*b*.

Referring to FIG. 10, the beacon management device 800 confirms that a beacon device on which firmware upgrade is to be performed is the first beacon device 200*b* and transmits an upgrade progress notification message to the first beacon device 200*b* to inform the first beacon device 200*b* that the upgrade is scheduled (S1300).

Subsequently, the first beacon device 200*b* confirms information regarding the child beacon device connected to the first beacon device 200*b* (S1302).

The first beacon device 200*b* transmits an upgrade schedule notification message to a second beacon device 300*c* which is the confirmed child beacon device to inform the second beacon device 300*c* that the first beacon device 200*b* is scheduled to be upgraded soon (S1304).

Then, upon receiving the upgrade schedule notification message, the second beacon device 300*c* searches for a connectable beacon device (S1306).

When the search result is that the first beacon device 200*a* is connectable, the second beacon device 300*c* transmits a request for a connection to the first beacon device 200*a* (S1312).

Upon receiving the connection request from the second beacon device 300*c*, the first beacon device 200*a* transmits a signal for approving the connection to the second beacon device 300*c* according to whether the first beacon device 200*a* is in a connectable state (S1314). Then, the second beacon device 300*c* may maintain the connection to the first beacon device 200*a* and thus may be allowed to use a mesh network even while the parent beacon to which the second beacon device 300*c* has been connected is upgraded (S1316).

The beacon management device 800 transmits data for performing firmware upgrade on the first beacon device 200*b* (S1308).

The first beacon device 200*b* receives the data for the upgrade from the beacon management device 800 and performs the upgrade (S1310).

Subsequently, when the upgrade is completed, the first beacon device 200*b* confirms information regarding the child beacon device in order to inform the child beacon device from which the network is disconnected that the upgrade is completed and thus reconnection is allowed.

The first beacon device 200*b* confirms that the child beacon device is the second beacon device 300*c* and transmits an upgrade completion notification message to the second beacon device 300*c* (S1320).

Upon receiving the upgrade completion notification message from the first beacon device 200*b*, the second beacon device 300*c* requests the currently connected first beacon device 200*a* to release the connection (S1322).

Upon receiving a signal for the connection release request, the first beacon device 200*a* releases the connection to the second beacon device 300*c* (1324).

Then, the second beacon device 300*c* requests a connection to the first beacon device 200*b* which is its original parent beacon. Upon receiving the request, the first beacon device 200*b* approves the connection (S1326, S1328).

The first beacon device 200*b* and the second beacon device 300*c* maintain a connection therebetween when the connection is approved by the first beacon device 200*b* (S1330).

That is, when the upgrade is completed, the first beacon device 200*b* and the second beacon device 300*c* are reconnected to each other.

Figure 11:
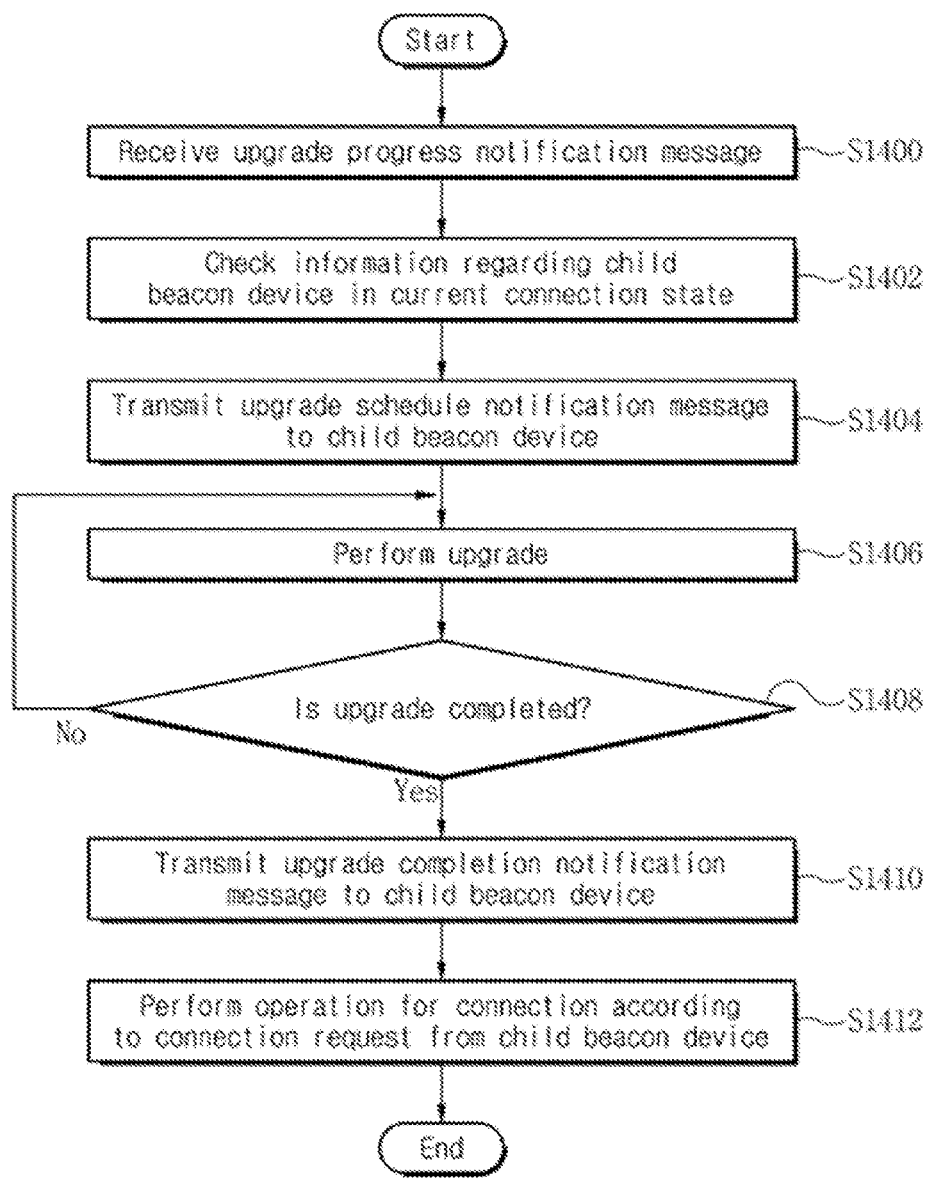
FIG. 11 is a flowchart showing a process of performing beacon upgrade by a parent beacon device according to a third embodiment of the present invention.

FIG. 11 is a flowchart showing a process of performing beacon upgrade by a parent beacon device according to a third embodiment of the present invention.

Referring to FIG. 11, the first beacon device 200*b* receives an upgrade process notification message, which is a message that informs the first beacon device 200*b* that an upgrade is scheduled to be performed soon, from the beacon management device 800 (S1400).

Upon receiving the upgrade progress notification message, the first beacon device 200*b* confirms information regarding its child beacon device (S1402).

Subsequently, the first beacon device 200*b* transmits an upgrade schedule notification message to a second beacon device 300*c*, which is the confirmed child beacon device, to inform the second beacon device 300*c* that the first beacon device 200*b* is scheduled to be upgraded and thus will disconnect the network from the second beacon device 300*c* after a while (S1404).

Meanwhile, upon receiving data for the upgrade from the beacon management device 800, the first beacon device 200*b* performs the upgrade (S1406).

When the upgrade is completed, the first beacon device 200*b* confirms information regarding the child beacon device in order to inform the child beacon device from which the network has been disconnected that the upgrade is completed and thus reconnection is allowed (S1408).

The first beacon device 200*b* confirms that the child beacon device is the second beacon device 300*c* and transmits an upgrade completion notification message to the second beacon device 300*c* (S1410).

Subsequently, when a connection is requested by the second beacon device 300*c*, the first beacon device 200*b* approves the connection to the second beacon device 300*c* (S1412).

Figure 12:
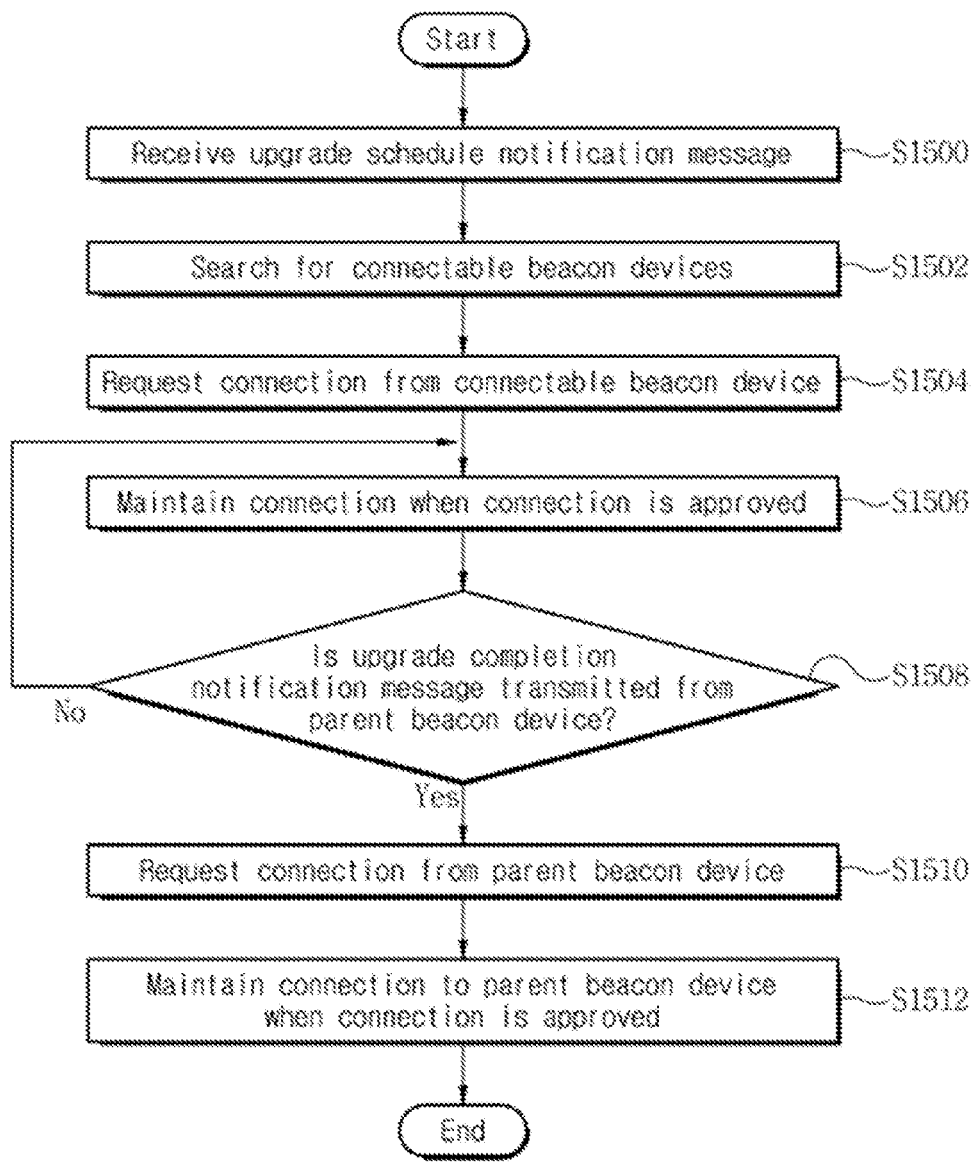
FIG. 12 is a flowchart showing a process of performing beacon upgrade by a child beacon device according to a third embodiment of the present invention.

FIG. 12 is a flowchart showing a process of performing beacon upgrade by a child beacon device according to a third embodiment of the present invention.

Referring to FIG. 12, the second beacon device 300*c* receives an upgrade schedule notification message, which is a message for informing the second beacon device 300*c* that the first beacon device 200*b* is scheduled to be upgraded soon, from the first beacon device 200*b* (S1500).

Then, upon receiving the upgrade schedule notification message, the second beacon device 300*c* searches for a connectable beacon device (S1502).

When the search result is that the first beacon device 200*a* is connectable, the second beacon device 300*c* transmits a request for a connection to the first beacon device 200*a* (S1504).

When a signal for approving the connection is received from the first beacon device 200*a*, the second beacon device 300*c* may maintain the connection to the first beacon device 200*a* and thus may be allowed to use a mesh network without disconnecting even while the parent beacon to which the second beacon device 300*c* has been connected is being upgraded (S1506).

Subsequently, the second beacon device 300*c* examines whether an upgrade completion notification message is received from the first beacon device 200*b* (S1508).

When the upgrade completion notification message is received from the first beacon device 200*b*, the second beacon device 300*c* performs an operation for releasing the connection to the currently connected first beacon device 200*a* and transmits a request for a connection to the first beacon device 200*b* (S1510). When the connection is approved by the first beacon device 200*b*, the second beacon device 300*c* maintains the connection to the first beacon device 200*b* which is the parent beacon.

When the upgrade is completed, the first beacon device 200*b* and the second beacon device 300*c* are reconnected to each other.

The above-mentioned functions may be executed in a computer by reading, installing, and executing the programs recorded in the computer-readable medium.

Here, in order for the computer to read the programs recorded in the recording medium and execute functions implemented with the programs, the above-mentioned programs may include program codes which are coded with computer languages such as C, C++, JAVA, machine language, and the like which may be read by a processor (e.g., a CPU) of the computer through a device interface of the computer.

The codes may include function codes associated with functions that define the above-mentioned functions and may also include an execution procedure related control code required to allow the processor of the computer to execute the above-mentioned functions according to a predetermined procedure. In addition, the code may further include a memory reference related code indicating at which location (address number) of the memory inside or outside the computer or additional information or media required for the processor of the computer to execute the above-mentioned functions.

Further, in order for the processor of the computer to execute the above-mentioned functions, when the processor needs to communicate with any other computers or servers, etc. at a remote location, the code may further include a communication-related code about how the processor of the computer communicates with any other computers or servers at a remote location or which information or media the processor of the computer transmits and receives at the time of the communication by using the communication module of the computer.

Examples of the computer-readable medium suitable for storing computer program instructions and data include a magnetic medium such as a hard disk, a floppy disk, and a magnetic tape, an optical medium such as a compact disk read only memory (CD-ROM), a digital video disk (DVD), etc., a magneto-optical medium such as a floptical disk, and a semiconductor memory such as a read only memory (ROM), a random access memory (RAM), a flash memory, an erasable programmable ROM (EPROM), and an electrically erasable programmable ROM (EEPROM). A processor and a memory may be supplemented by a specific purpose logic circuit or integrated into a specific purpose logic circuit.

The computer-readable recording medium can also be distributed over network coupled computer systems so that the computer-readable code is stored and executed in a distributed fashion. In addition, a functional program for implementing the present invention, a code and a code segment associated therewith, and the like may be easily inferred or changed by programmers in the art to which the present invention pertains by considering a system environment of the computer which reads the recording medium and executes the program.

Each step of the method according to embodiments of the present invention may be implemented with computer-readable instructions and executed by a computing system. Here, a "computing system" is defined as one or more software modules, one or more hardware modules, or combinations thereof that work together to perform operations on electronic data. For example, the definition of computing system includes the hardware components of a personal computer as well as software modules such as an operating system of the personal computer. The physical layout of the modules is not important. A computer system may include one or more computers coupled via a network.

Likewise, a computing system may include a single physical device where internal modules such as a memory and processor work together to perform operations on electronic data.

That is, the apparatus for performing a method of operating a wireless mesh network using a mesh network according to the present invention may be implemented to perform the above-described embodiments based on the computing system to be described below.

Figure 13:
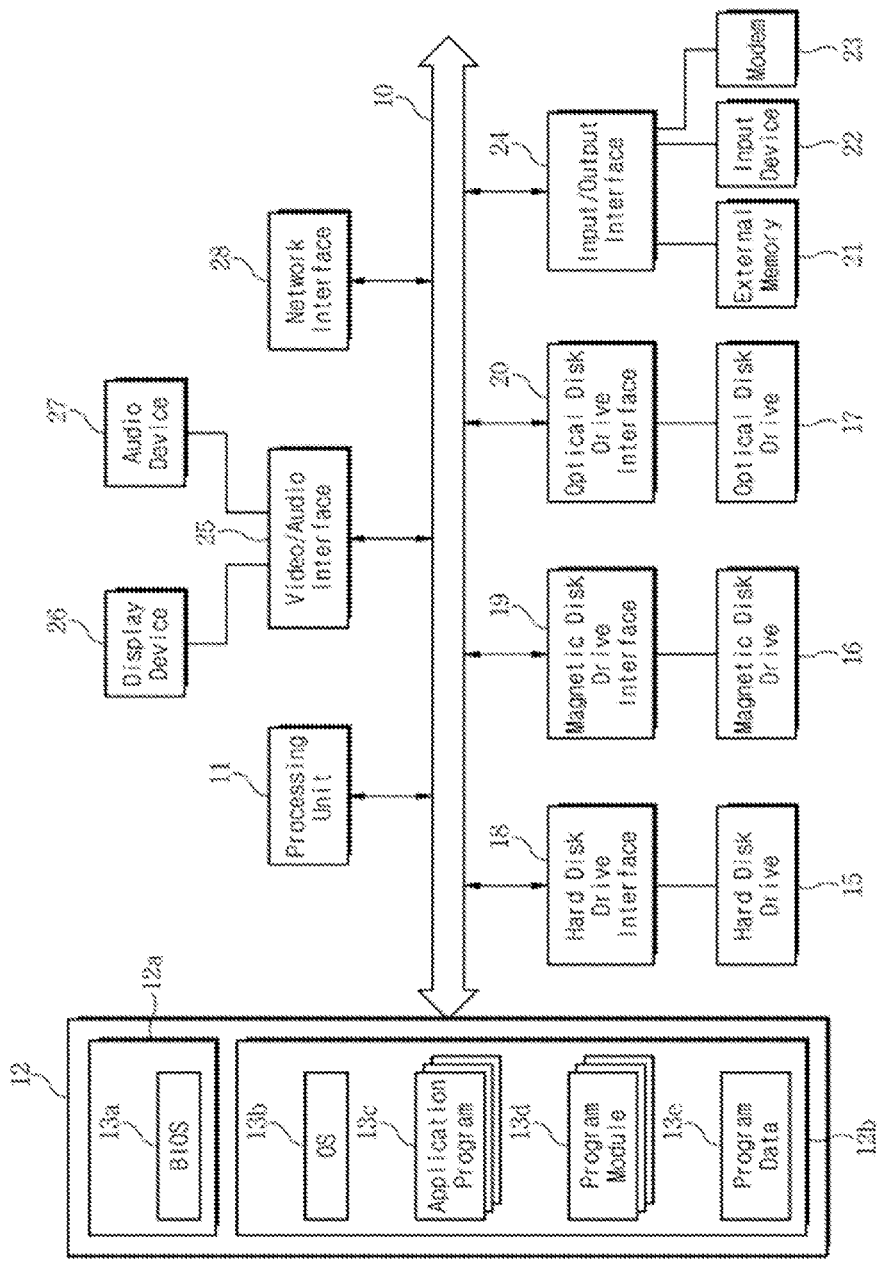
FIG. 13 is a view showing an operating environment of an apparatus for providing a method of detecting an abnormal state of a beacon device according to an embodiment of the present invention.

FIG. 13 is a view showing an operating environment of an apparatus for providing a method of detecting an abnormal state of a beacon device according to an embodiment of the present invention.

FIG. 13 and the following discussion are intended to provide a brief, general description of a suitable computing environment in which the present invention may be implemented. Although not required, the invention will be described in the general context of computer-executable instructions such as program modules being executed by computer systems.

Generally, program modules include routines, programs, objects, components, data structures, and the like, which perform particular tasks or implement particular abstract data types. Computer-executable instructions, associated data structures, and program modules represent examples of the program code means for realizing the invention disclosed herein.

Referring to FIG. 13, an example computing system for implementing the invention includes a general-purpose computing device in the form of a computing system including a processing unit 11, a system memory 12, and a system bus 10 that couples various system components including the system memory 12 to the processing unit 11.

The processing unit 11 may execute computer-executable instructions designed to implement features of the present invention.

The system bus 10 may be any of several types of bus structures including a memory bus or memory controller, a peripheral bus, and a local bus using any of a variety of bus architectures. The system memory 12 includes a read only memory (ROM) 12a and a random access memory (RAM) 12b. A basic input/output system (BIOS) 13a containing the basic routines that help transfer information between elements within the computing system such as during start-up may be stored in the ROM 12a.

The computing system may include a storage device including, for example, a hard disk drive 15 for reading information from or writing information to a hard disk, a magnetic disk drive 16 for reading information from and writing information to a magnetic disk, and an optical disk drive 17 for reading information from or writing information to an optical disk such as, for example, a CD-ROM or other optical media. The hard disk drive 15, the magnetic disk drive 16, and the optical disk drive 17 are connected to the system bus 10 by a hard disk drive interface 18, a magnetic disk drive interface 19, and an optical drive interface 20, respectively.

In addition, the computing system may further include an external memory 21 as the storage device. The external memory 21 may be connected to the system bus 10 through an input/output interface 24.

The above-described drives and the computer-readable media read and written by the drives provide nonvolatile storage of computer-executable instructions, data structures, program modules, and other data.

Although the example environment described herein employs the hard disk drive 15, the magnetic disk drive 16, and the optical disk drive 17, other types of computer-readable media for storing data may be used including magnetic cassettes, flash memory cards, digital versatile disks, Bernoulli cartridges, RAMs, ROMs, and the like.

Program code means that includes one or more program modules including an operating system 13b, one or more application programs 13c, other program modules 13d, and program data 13e which are loaded and executed by the processing unit 11 may be stored in the hard disk drive 15, the magnetic disk drive 16, the optical disk drive 17, the ROM 12a, or the RAM 12b.

Moreover, a user may enter commands and information into the computing system through a keyboard, a pointing device, or other input devices 22 such as, for example, a microphone, joy stick, game pad, scanner, or the like. These input devices 22 can be connected to the processing unit 11 through the input/output interface 24 coupled to the system bus 10. The input/output interface 24 logically represents any of a wide variety of possible interfaces such as, for example, a serial port interface, a PS/2 interface, a parallel port interface, a Universal Serial Bus (USB) interface, or an Institute of Electrical and Electronics Engineers (IEEE) 1394 interface (i.e., a FireWire interface) or may even logically represent a combination of different interfaces.

In addition, the computing system according to the present invention may further include a display device 26 such as a monitor or liquid crystal display (LCD) and an audio device 27 such as a speaker or microphone. The display device 26 and the audio device 27 are connected to the system bus 10 through a video/audio interface 25. For example, other peripheral devices (not shown) such as, for example, speakers and printers, can also be connected to computer system. The video/audio interface 25 may include a High Definition Multimedia Interface (HDMI), a Graphics Device Interface (GDI), etc.

In addition, the computing system is connectable to networks such as, for example, an office-wide or enterprise-wide computer network, a home network, an intranet, and/or the Internet. The computer system can exchange data with external sources such as, for example, remote computer systems, remote applications, and/or remote databases over such networks.

The computing system according to the present invention includes a network interface 28 through which data are received from and/or transmitted to external sources.

In the present invention, the computing system may transmit information to or receive information from a device located at a remote location through the network interface 28.

For example, when the computing system denotes the first beacon device 200, the computing system may transmit information to or receive information from the service device 400 through the network interface 28. On the other hand, when the computing system denotes the service device 400, the computing system may transmit information to or receive information from the first beacon device 200 through the network interface 28.

The network interface 28 may be represented in a logical combination of one or more software and/or hardware modules such as, for example, a network interface card and a corresponding Network Driver Interface Specification (NDIS) stack.

Likewise, the computing system receives data from external sources and/or transmits data to external sources through the input/output interface 24. The input/output interface 24 may be coupled to a modem 23 (e.g., a standard modem, a cable modem, or a digital subscriber line (DSL) modem) through which data are received from and/or transmitted to external sources.

While FIG. 13 represents a suitable operating environment for the present invention, the principles of the present invention may be employed in any system that is capable of implementing the principles of the present invention, with suitable modifications if necessary. The environment illustrated in FIG. 13 is illustrative only and by no means represents even a small portion of the wide variety of environments in which the principles of the present invention may be implemented.

Moreover, various pieces of information that are generated when the wireless network setting program according to the present invention is executed may be stored and accessed from any of the computer-readable media associated with the computer system. For example, portions of such program modules and portions of associated program data may be included in the operating system 13b, the application programs 13c, the program modules 13d, and/or the program data 13e, for storage in the system memory 12.

When a mass storage device, such as, for example, a hard disk, is coupled to the computing system, such program modules and associated program data may also be stored in the mass storage device. In a networked environment, program modules associated with the present invention or portions thereof can be stored in remote memory storage devices such as, for example, a system memory and/or mass storage devices associated with a remote computer system connected through the modem 23 of the input/output interface 24 or the network interface 28 and for example, computing systems of the first beacon device 200 and the service device 400. As described above, execution of such modules may be performed in a distributed environment.

The specification includes details of a number of specific implements, but it should be understood that the details do not limit the invention or what is claimable in the specification but rather describe features of the specific embodiment. Features described in the specification in the context of individual embodiments may be implemented as a combination in a single embodiment.

In contrast, features described in the specification in the context of a single embodiment may be implemented in multiple embodiments individually or in an appropriate sub-combination. Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in a certain order in the drawings, it should not be understood that the operations be executed in the certain order or in a sequential order to obtain desired results or that all the operation be executed. In some cases, multitasking and parallel processing may be advantageous. In addition, it should not be understood that the separation of various system components in the above described embodiments is required in all embodiments, and it should be understood that the above described program components and systems may be incorporated into a single software product or may be packaged in multiple software products.

The description suggests the best mode of the invention to provide an example that explains the invention and also enables one skilled in the art to manufacture and use the present invention. The specification drafted as such is not limited to detailed terms suggested in the specification. Accordingly, it will be apparent to those skilled in the art that various modifications, changes, and variations may be made in the example without departing from the scope of the invention.

Accordingly, the scope of the present invention should be defined not by the embodiments but by the claims.

What is claimed is:

1. A service device for providing service information corresponding to beacon identification information to a plurality of user terminal devices through a communication network, the service device comprising:
   a communicator configured to:
      communicate with a beacon device and the user terminal device, respectively; and
      collect information regarding service traffic of the beacon device;
   a processor configured to:
      collect statistical data regarding the service traffic of the beacon device in a normal state;
      monitor service traffic generated between the service device and the plurality of user terminal devices;
      determine a state of the beacon device corresponding to the beacon identification information based on a variation of an amount of service traffic, wherein the beacon identification information is assigned to each beacon device;
      receive, from the user terminal device, a service request based on the beacon identification information;
      identify the service information stored in a memory that is corresponding to the beacon identification information; and
      transmit, to the user terminal device, the identified service information corresponding to the beacon identification information; and
   the memory configured to:
      store the service information corresponding to the beacon identification information; and
      store an average amount of the service traffic of the beacon device in the normal state based on the collected statistical data.

2. The service device of claim 1, wherein the processor is further configured to:
   compare the service traffic of the beacon device with the statistical data; and determine the state of the beacon device.

3. The service device of claim 2, wherein the processor is configured to determine that the beacon device is in an abnormal state when a difference between the monitored service traffic and the statistical data is equal to or greater than a first reference value or when the monitored service traffic is equal to or less than a second reference value.

4. The service device of claim 1, wherein the processor is further configured to control the beacon device to change channels when an interference in the beacon device is determined to have occurred.

5. The service device of claim 1, wherein the processor is further configured to:
   when an interference in the beacon device is determined to have occurred check whether the beacon device is connectable to a wireless AP device;
   check whether the beacon device is connected to second beacon device or the wireless AP device; and
   when the beacon device is connected to the second beacon device, disconnect the beacon device from the second beacon device and connect the beacon device to the wireless AP device or third beacon device.

6. A non-transitory computer-readable recording medium having a program recorded thereon, the program configured to direct a processor to:
   collect statistical data regarding service traffic of a beacon device in a normal state;
   monitor service traffic generated between a service device and a plurality of user terminal devices, wherein the service device is configured to provide service information corresponding to beacon identification information to the plurality of user terminal devices through a communication network;
   determine a state of the beacon device corresponding to the beacon identification information based on a variation of an amount of service traffic, wherein the beacon identification information is assigned to each beacon device;
   receive, from the user terminal device, a service request based on the beacon identification information;
   identify the service information stored in a memory that is corresponding to the beacon identification information; and
   transmit, to the user terminal device, the identified service information corresponding to the beacon identification information.

7. A service device for providing service information corresponding to beacon identification information to a plurality of user terminal devices through a communication network, the service device comprising:
   a communicator configured to:
      communicate with a beacon device and the user terminal device, respectively; and
      collect information regarding service traffic of the beacon device;
   a processor configured to:
      collect statistical data regarding the service traffic of the beacon device in a normal state;
      monitor service traffic generated between the service device and the plurality of user terminal devices;
      determine a state of the beacon device corresponding to the beacon identification information based on a variation of an amount of service traffic, wherein the beacon identification information is assigned to each beacon device;
      receive, from the user terminal device, a service request based on the beacon identification information;
      identify the service information stored in a memory that is corresponding to the beacon identification information; and
      transmit, to the user terminal device, the identified service information corresponding to the beacon identification information; and
   the memory configured to:
      store the service information corresponding to the beacon identification information; and
      store an average amount of the service traffic of the beacon device in the normal state based on the collected statistical data, wherein
   the communicator is further configured to periodically receive, from the beacon device, a state check message; and
   the processor is further configured to:
      determine whether the service traffic of the beacon device is valid based on the received state check message; and
      control the beacon device such that the beacon device changes channels.

8. The service device of claim 7, wherein the processor is further configured to:
   determine the state of the beacon device based on a validity of the service traffic when the state check message is not received for a predetermined amount of time.

9. The service device of claim 8, wherein the processor is configured to:
   compare the amount of service traffic with a predetermined reference amount of service traffic;
   determine that the beacon device has a failure when the currently generated amount of service traffic has decreased by a reference value or more from the predetermined reference amount of service traffic; and
   determine that there is interference in the beacon device when the currently generated amount of service traffic has not decreased by a reference value or more from the predetermined reference amount of service traffic.

10. The service device of claim 9, wherein the processor is configured to:
   measure the average amount of service traffic generated corresponding to the beacon device in the normal state; and
   set the average amount of service traffic as the reference amount of service traffic.

\* \* \* \* \*